United States Patent
Hurry

(10) Patent No.: US 9,959,576 B2
(45) Date of Patent: May 1, 2018

(54) MULTI-PURPOSE DEVICE HAVING MULTIPLE CERTIFICATES INCLUDING MEMBER CERTIFICATE

(71) Applicant: VISA INTERNATIONAL SERVICE ASSOCIATION, San Francisco, CA (US)

(72) Inventor: Simon Hurry, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 316 days.

(21) Appl. No.: 13/707,431

(22) Filed: Dec. 6, 2012

(65) Prior Publication Data

US 2013/0197946 A1    Aug. 1, 2013

Related U.S. Application Data

(60) Provisional application No. 61/567,771, filed on Dec. 7, 2011.

(51) Int. Cl.
*G06Q 20/40* (2012.01)
*G06Q 40/08* (2012.01)
(Continued)

(52) U.S. Cl.
CPC ......... *G06Q 40/08* (2013.01); *G06Q 20/3823* (2013.01); *G06Q 20/3825* (2013.01);
(Continued)

(58) Field of Classification Search
USPC .......................................................... 705/4
See application file for complete search history.

(56) References Cited

U.S. PATENT DOCUMENTS 6,463,534 B1 * 10/2002 Geiger ............... G06F 21/10
   380/278
6,571,221 B1 * 5/2003 Stewart ............... H04L 12/14
   705/52

(Continued)

FOREIGN PATENT DOCUMENTS

KR  10-2004-0017153 A   2/2004
KR  10-2004-0055776 A   6/2004

OTHER PUBLICATIONS

International Search Report and Written Opinion for PCT International Patent Application No. PCT/US2012/068580, dated Mar. 25, 2013, 12 pages.

*Primary Examiner* — Robert R Niquette
(74) *Attorney, Agent, or Firm* — Kilpatrick, Townsend & Stockton LLP

(57) ABSTRACT

Embodiments of the invention relate to systems and methods for provisioning and using a multi-purpose device. The device contains information regarding a plurality of memberships. The device contains one or more membership certificate chains, comprising multiple certificates, wherein a membership provider certificate is signed by a private key associated with a membership root certificate authority, and wherein a member certificate is signed by a private key associated with the membership provider certificate. The member certificate includes member attributes regarding the user, such as member benefit information. The device also includes a payment certificate chain, comprising multiple certificates, wherein a payment provider certificate is signed by a private key associated with a payment root certificate authority, and wherein a payment certificate is signed by a private key associated with the payment provider certificate. The payment certificate includes payment attributes regarding the user, such as a payment account.

22 Claims, 18 Drawing Sheets

(51) Int. Cl.
*G06Q 50/22* (2018.01)
*G06Q 20/38* (2012.01)

(52) U.S. Cl.
CPC ....... *G06Q 20/38215* (2013.01); *G06Q 20/40* (2013.01); *G06Q 50/22* (2013.01)

(56) References Cited

U.S. PATENT DOCUMENTS

| | | | |
|---|---|---|---|
| 7,577,621 B2 | 9/2009 | Dickinson et al. | |
| 7,769,690 B2 | 8/2010 | Dare et al. | |
| 8,768,838 B1* | 7/2014 | Hoffman | G06Q 40/00 705/44 |
| 2002/0116367 A1* | 8/2002 | Brown | G06F 21/64 |
| 2002/0120848 A1* | 8/2002 | Mont | G06F 21/64 713/175 |
| 2003/0115475 A1* | 6/2003 | Russo | G06K 9/00026 713/186 |
| 2004/0171374 A1 | 9/2004 | Little et al. | |
| 2005/0154909 A1* | 7/2005 | Zhang | G06Q 20/3674 726/5 |
| 2006/0010007 A1 | 1/2006 | Denman et al. | |
| 2007/0192590 A1 | 8/2007 | Pomerantz et al. | |
| 2009/0198618 A1* | 8/2009 | Chan | G06Q 20/02 705/66 |
| 2013/0346115 A1* | 12/2013 | Peak | G06Q 40/08 705/4 |

\* cited by examiner

MULTI-PURPOSE DEVICE HAVING MULTIPLE CERTIFICATES INCLUDING MEMBER CERTIFICATE

CROSS-REFERENCES TO RELATED APPLICATIONS

The present application is a non-provisional application of and claims priority to U.S. Provisional Application No. 61/567,771, filed on Dec. 7, 2011, the entire contents of which are herein incorporated by reference for all purposes.

BACKGROUND

Fraud in the medical service industry is a problem, both in the private and public sector. For instance, a plastic card is commonly used to verify the benefits associated with an individual for medical services. The patient arrives at the medical clinic or pharmacy with a plastic card bearing the insurance provider's name, the name of the person receiving the medical service and in some cases the co-payment requirement. However, a forger can duplicate an insurance card allowing an individual seeking medical service to associate themselves with a set of benefits that they may not be entitled to.

Additionally, inconvenience and inefficiency are other problems in the medical industry. A typical patient carries with them multiple cards for different benefits (medical, dental, vision, medicine, etc.) and yet more cards to make payments for the co-payments or remaining balances for the medical services.

Furthermore, when requesting service, the patient has little understanding of the ultimate financial responsibility from the transaction until much later. Usually, the medical service provider or the patient calls the medical insurer to discuss the coverage further adding to the inefficiency. In many instances, the billing for the medical service provided begins long after the medical services are provided to the patient. The billing is usually accomplished by a long back and forth discourse through mail between the medical service provider, the medical insurer and the patient that usually includes statements, reminders, insurance benefit explanations and appeals. This process of operating with non-verified and incomplete information leads to dissatisfaction and inefficiencies in the system.

Embodiments of the invention address these and other problems.

SUMMARY

Embodiments of the invention broadly described, allow members of an organization to integrate member attributes with payment attributes on a multi-purpose device whose security is provided by a public-key infrastructure system.

Embodiments of the invention relate to systems and methods for provisioning and using a multi-purpose device. The device contains information regarding a plurality of memberships associated with a user and a payment account associated with the user. The device contains one or more membership certificate chains, comprising multiple certificates, wherein a membership provider certificate is signed by a private key associated with a membership root certificate authority, and wherein a member certificate is signed by a private key associated with the membership provider certificate. The member certificate includes member attributes regarding the user, such as member benefit information. The device may optionally include data which is signed by a private key stored on the device and associated with the member certificate. The device also includes a payment certificate chain, comprising multiple certificates, wherein a payment provider certificate is signed by a private key associated with a payment root certificate authority, and wherein a payment certificate is signed by a private key associated with the payment provider certificate. The payment certificate includes payment attributes regarding the user, such as a payment account.

A user may present the multi-purpose device to a service provider in order to prove membership benefits. The service provider may authenticate the device by verifying the signatures in the membership certificate chain. The service provider may also read from the device member benefit information associated with the user. The service provider may calculate a final billing amount based on the member benefit information, and bill the user for the amount using the payment attributes stored on the multi-purpose device. As a result, the service provider is assured of the authenticity of the user and the member attributes, and can quickly determine the amount to be billed to the user. The user is made aware of the final cost of a service at the time they present the device to the service provider.

One embodiment of the invention discloses a computer implemented method for verifying benefits associated with a multi-purpose device, comprising: electronically receiving, at a terminal, a member certificate comprising member attributes from a multi-purpose device, wherein the member certificate is signed by a membership provider certificate authority associated with a payment processing network; digitally verifying the contents of the member certificate; and determining from the member attributes member benefit information for a member.

One embodiment of the invention discloses a computer-implemented method for providing certificates to a membership provider and payment provider, comprising: electronically receiving, from a membership provider server computer, a membership provider public key and a first request to generate a membership provider certificate; generating the membership certificate using the membership provider public key and a first private key, wherein the membership provider certificate is stored on a device; electronically receiving, from an payment provider server computer, a payment provider public key and a second request to generate a payment provider certificate; and generating the payment provider certificate using the payment provider public key and a second private key, wherein the payment provider certificate is stored on the device.

One embodiment of the invention discloses a multi-purpose device, comprising: a root certificate; a membership provider certificate, wherein the membership provider certificate is signed by a private key associated with the root certificate; a member certificate, wherein the member certificate is signed by a private key associated with the membership provider certificate; a payment provider certificate, wherein the payment provider certificate is signed by the private key associated with the root certificate; and a payment certificate, wherein the payment certificate is signed by a private key associated with the payment provider certificate.

Further details regarding embodiments of the invention can be found in the Detailed Description and the Figures.

DETAILED DESCRIPTION

Figure 1:
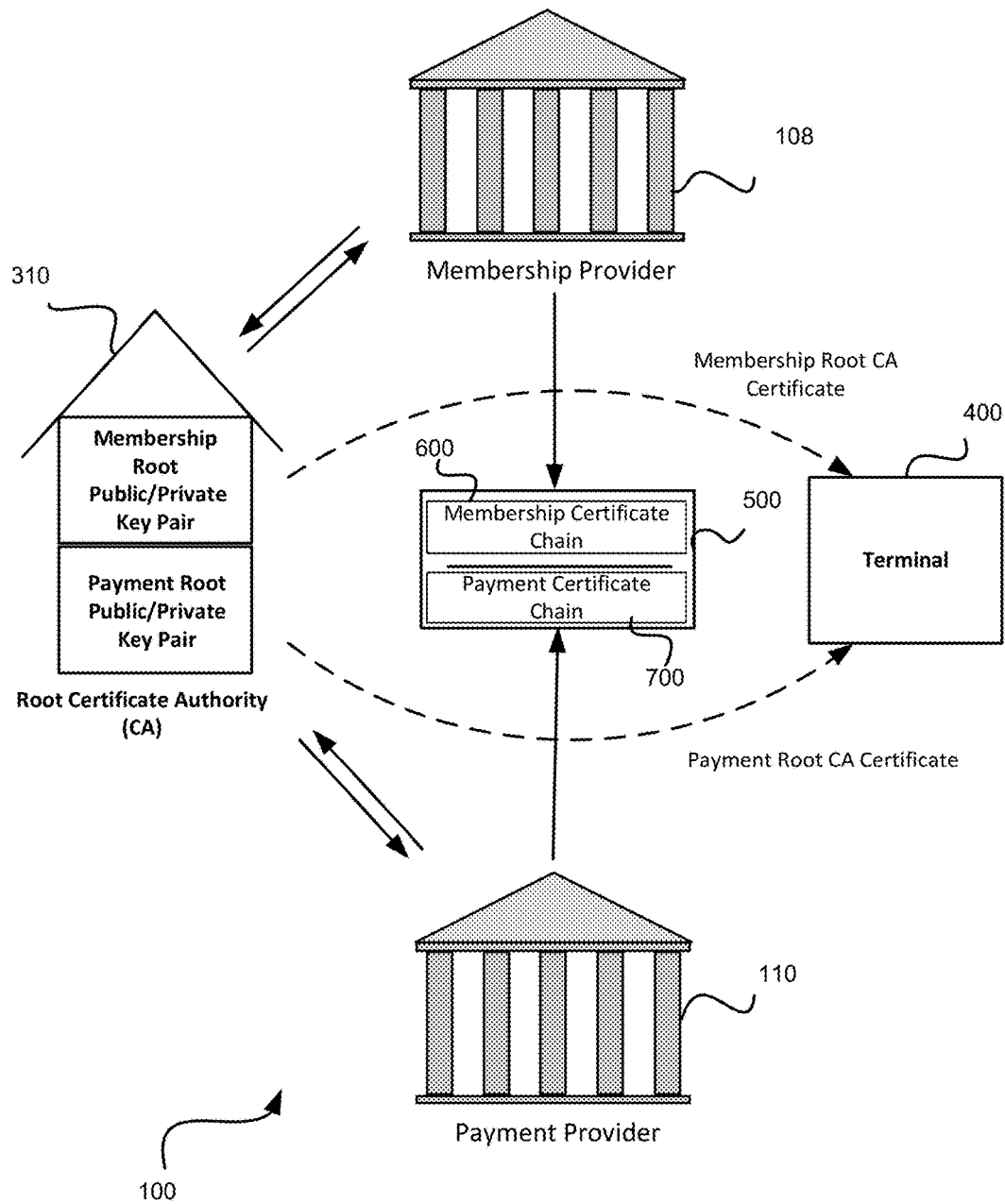
FIG. 1 shows a block diagram of a system according to an embodiment of the invention. The system can be used to conduct an online transaction with a separate client compute.

Prior to discussing embodiments of the invention, description of some terms may be helpful in understanding embodiments of the invention.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss.

A "digital signature" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate is signed by a certificate authority.

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA also typically maintains a database of all certificates issued by the CA.

In a typical process, the certificate authority receives an unsigned certificate from an entity whose identity is known. The unsigned certificate includes a public key, one or more data fields, and a hash of the data in the certificate. The CA signs the certificate with a private key corresponding to the public key included on the CA certificate. The CA may then store the signed certificate in a database, and issue the signed certificate to the entity.

A device may be configured with one or more "trusted root certificate authorities" (trusted root CAs). A trusted root CA is a certificate authority whose certificate is self-signed, and which a device trusts independently. Examples entities which operate trusted root CAs may include Visa, Mastercard, Verisign, and Thawte.

In a typical process, a certificate may be "verified" by verifying the signature of the certificate and verifying the certificate of the CA that signed the certificate. The signature of a certificate may be verified by decrypting the signature using the public key associated with the certificate authority. The decrypted value is compared to an expected value based on the contents of the certificate. If the values are the same, the signature is verified. Each subsequent CA certificate is verified in a similar manner, until a trusted root CA is reached, or until a certificate cannot be verified. The sequence of certificates from a certificate to be verified to the trusted root CA is known as a "certificate chain".

The term "membership provider" may be used to describe an organization with members, or an entity that administrates membership in the organization. Typically, the membership provider will provide benefits to members, and will maintain information about members. Examples of membership providers may include bicycle clubs, automotive associations, healthcare insurance providers, schools, and universities.

The term "membership provider certificate" may be used to describe a certificate associated with the identity of a membership provider. The membership provider certificate may include a membership provider public key in a key pair associated with the membership provider, one or more data fields, and a signature by a certificate authority. A membership provider certificate may be used to establish the identity of a membership provider certificate authority for signing and issuing member certificates.

The term "member" may be used to describe a member of an organization. A member may have a financial relationship with the organization, for example a customer of an insurance provider. Alternately, a member may have a non-financial relationship with the organization, such as a student in a public high school.

The term "member certificate" may be used to describe a certificate associated with the identity of a member and authenticated by the membership provider. The member certificate may include a member public key in a key pair associated with the member, one or more data fields, and a signature by a membership provider.

The term "member data" may be used to describe data written by a member or member device. Member data may include any data signed, encrypted, or otherwise secured by the member private key.

The term "payment provider" may be used to describe a provider of payment services. A payment provider may be the issuer of a credit or debit card, a bank, an Internet funds transfer service, a broker, etc. The payment provider may maintain an account for the person or entity.

The term "payment provider certificate" may be used to describe a certificate associated with the identity of a payment provider. The payment provider certificate may include a payment provider public key in a key pair associated with the payment provider, one or more data fields, and a signature by a certificate authority.

The term "payment certificate" may be used to describe a certificate associated with the identity of a payment account. A payment certificate may include a payment public key in a key pair associated with the payment account, payment attributes, and a signature by a payment provider certificate authority. "Payment attributes" may include a payment account or any other data which may be used to effect payment from a financial account.

A "service provider" may be any provider of goods and services. Examples of service providers may include healthcare providers such as hospitals, clinics, or doctors, automotive service providers, cafeterias, or transit associations.

A "terminal" may be any device used to communicate with a multi-payment device. Examples of terminals include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

Embodiments of the invention broadly described, enable the integration of member attributes with payment attributes on a multi-purpose device whose security is provided by a public-key infrastructure system.

Embodiments of the invention relate to systems and methods for provisioning and using a multi-purpose device. The device contains information regarding one or more memberships associated with a user and information regarding a payment account associated with the user. The device contains one or more membership certificate chains, comprising multiple certificates, wherein a membership provider certificate is signed by a private key associated with a membership root certificate authority, and wherein a member certificate is signed by a private key associated with the membership provider certificate. The member certificate includes member attributes regarding the user, such as membership benefits. The device stores a public/private key pair, wherein the public key is contained on the member certificate. The device may optionally include data which is signed by a private key stored on the device and associated with the member certificate. The device also includes a payment certificate chain, comprising multiple certificates, wherein a payment provider certificate is signed by a private key associated with a payment root certificate authority, and wherein a payment certificate is signed by a private key associated with the payment provider certificate. The payment certificate includes payment attributes regarding the user, such as a payment account.

A user may present the multi-purpose device to a service provider in order to prove membership benefits. The service provider may authenticate the device by verifying the signatures in the membership certificate chain. The service provider may also read from the device a list of benefits associated with the user. The service provider may calculate a final billing amount based on the list of benefits, and bill the user for the amount using the payment attributes stored on the multi-purpose device. As a result, the service provider is assured of the authenticity of the user and the member attributes, and can quickly determine the amount to be billed to the user. The user is made aware of the final cost of a service at the time they present the device to the service provider. Embodiments of the invention provide multiple advantages that are discussed below using a number of simplistic examples.

Embodiments of the invention provide the advantage of enabling a service provider to securely verify membership benefits associated with a user. In some embodiments, the service provider may use a terminal to read a membership certificate chain from the multi-purpose device. The terminal may be pre-loaded with one or more trusted root certificates. The terminal may then verify the certificate chain by verifying the signature of the membership provider certificate using the trusted root certificates, and verifying the signature of the member certificate using the membership provider certificate. This allows the service provider assurance that the membership benefits stored in the member certificate accurately reflect those assigned by the membership provider, and are not tampered with.

Embodiments of the invention also provide the advantage of enabling a service provider to securely authenticate a user attempting to use a device. In some embodiments, the service provider uses a terminal to read member attributes from the multi-purpose device containing identification attributes. The service provider requests the user to provide a government-issued ID card and corroborates the ID with the identification attributes stored on the multi-purpose device. If the identification attributes are consistent, the service provider is assured that the user is the same person or entity as the member.

In various embodiments, the user may also be required to provide biometric or password data to the terminal. The terminal reads this data using a data input device. The terminal compares the user input with biometric or password data stored in the identification attributes. For a user to be successfully authenticated, the user input must match the stored data. Biometric and password information allow the service provider to have greater confidence that the user is the same person or entity as the member.

Embodiments of the invention also provide the advantage of enabling secure transmission of information between a user's device and a service provider. In various embodiments, the terminal generates a session key which may be used to encrypt and decrypt data transmitted between the terminal and the multi-purpose device. The terminal encrypts the session key with the public key associated with the member certificate. The multi-purpose device then decrypts the encrypted session key using the private key associated with the member certificate. All subsequent communication between the terminal and device are encrypted using the session key. This enables communication between the terminal and multi-purpose device to be secure against eavesdropping, spoofing, forgery, and other forms of data capture or manipulation.

Embodiments of the invention also provide the advantage of enabling secure storage of information on a multi-purpose device. Member data on the device may be signed by a member private key. Therefore, an attacker with access to the member data would not be able to change the contents of the member data without causing a mismatch between the signature and the member data.

The above examples highlight only a few of the advantages of using a multi-purpose device to provide membership and payment attributes.

I. Exemplary Systems

FIG. 1 is a typical system illustrating the relationship between various entities which interact with the multi-purpose device. Typical system 100 comprises a membership provider 108, a payment provider 110, a root certificate authority 310, a terminal 400, and a multi-purpose card 500. The card 500 may be an example of a multi-purpose device. In other embodiments, the multi-purpose device may comprise a phone, a fob, etc.

Root certificate authority 310 is responsible for issuing certificates to one or more payment providers and one or more membership providers. The root certificate authority 310 comprises a membership root public/private key pair, the private key of which is used to sign certificates issued to membership providers 108. The root certificate authority also comprises a payment root public/private key pair, the private key of which is used to sign certificates issued to payment providers 110.

Membership provider 108 is responsible for issuing member certificates to members of an organization. Membership provider 108 may comprise several databases and computer systems (not shown) to store member records and administer member benefits. Membership provider 108 issues member certificates to members and may load a corresponding membership certificate chain 600 on to a multi-purpose device 500.

Payment provider 110 is responsible for issuing payment certificates to holders of payment accounts. Payment provider 110 may comprise several databases and computer systems (not shown) to maintain payment account holder information, payment account information such as account balances and account numbers, and other related information. Payment provider 110 may be, for example, a bank, a credit or debit card issuer, a payment processor, a money transfer business, or an entity responsible for administering accounts for a financial institution. Payment provider 110 issues payment certificates to payment account holders and may load a corresponding payment certificate chain 700 on to a multi-purpose device 500.

Terminal 400 is typically operated by a service provider. Terminal 400 interfaces with multi-purpose device 500. In various embodiments, terminal 400 stores a membership root CA certificate and a payment root CA certificate.

Multi-purpose device 500 may be a mobile phone, tablet, smart card, wearable computer, or any other suitable device for storing member certificate chain 600 and payment certificate chain 700.

Figure 2:
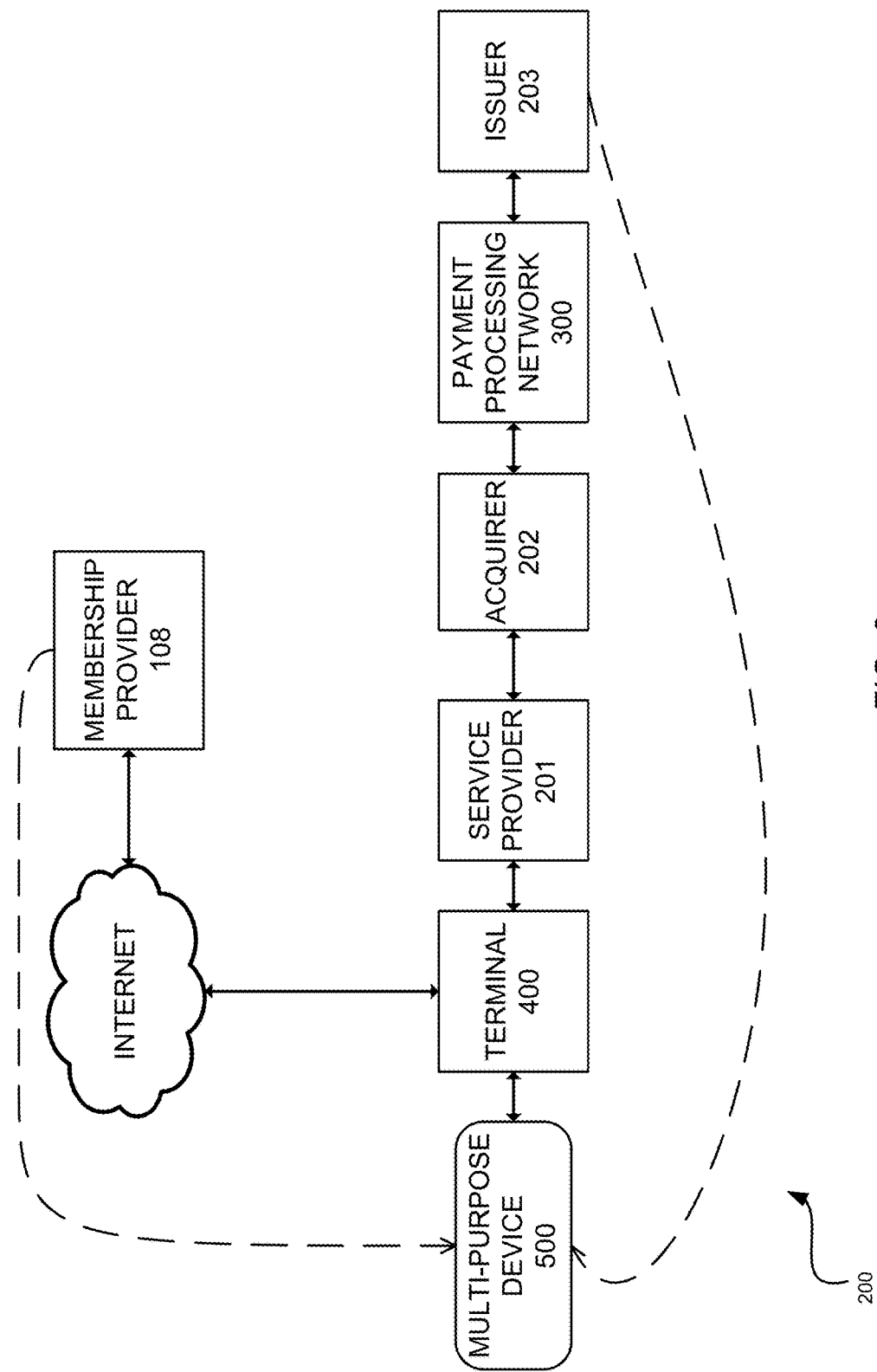
FIG. 2 illustrates an exemplary system through which the multi-purpose device may be used to perform payment transactions.

FIG. 2 illustrates an exemplary system through which the multi-purpose device may be used to perform payment transactions. The system 200 includes a service provider 201 and an acquirer 202 associated with the service provider 201. In a typical payment transaction, a user (not shown) may purchase goods or services at the service provider 201 using a multi-purpose device 500. The acquirer 202 can communicate with an issuer 203 via a payment processing network 300.

The acquirer 202 is typically a bank that has a service provider account. The issuer 203 may also be a bank, but could also be business entity such as a retail store. Some entities are both acquirers and issuers, and embodiments of the invention include such entities.

The user may be an individual, or an organization such as a business that is capable of purchasing goods or services.

The payment processing network 300 may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 300 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 300 may use any suitable wired or wireless network, including the Internet.

The service provider 201 may also have, or may receive communications from, a terminal 400 that can interact with the multi-purpose device 500. In embodiment of a system of FIG. 2, the terminal 400 is located at the service provider 201. However, it could be located at any other suitable location in other embodiments of the invention.

The terminal 400 may include a reader 430, a processor 410, and a computer readable memory 450. The reader 430 may include any suitable contact or contactless mode of operation. For example, exemplary card readers can include RF (radio frequency) antennas, magnetic stripe readers, etc. to interact with the multi-purpose device 500.

Typically, the multi-purpose device 500 is provisioned before it is delivered to the user. For example, in some embodiments of the invention, membership provider 108 may load a membership certificate chain onto the multi-purpose device 500 with information corresponding to the member associated with the device 500. The issuer 203 may load a payment certificate chain onto the multi-purpose device with information corresponding to an account the user maintains with the issuer. In an alternate embodiment, a third party such as the payment processing network 300 may load all information onto the multi-purpose device 500.

In some embodiments, the multi-purpose device 500 may be delivered to the user by the issuer. The user may activate the device 500 similarly to standard credit card activation procedures. In other embodiments, membership provider 108 or payment processing network 300 may deliver the multi-purpose device 500.

In a typical purchase transaction, the user purchases a good or service at the service provider 201 using a multi-purpose device 500 such as a credit card. The user's multi-purpose device 500 can interact with a terminal 400 such as a POS (point of sale) terminal at the service provider 201. For example, the user may take a credit card and may swipe it through an appropriate slot in the POS terminal.

Alternatively, the POS terminal may be a contactless reader, and the multi-purpose device 500 may be a contactless device such as a contactless card. In certain embodiments, the multi-purpose device 500 may be a mobile device.

An authorization request message is then forwarded to the acquirer 202. After receiving the authorization request message, the authorization request message is then sent to the payment processing network 300. The payment processing network 300 then forwards the authorization request message to the issuer 203 of the multi-purpose device 500.

After the issuer 203 receives the authorization request message, the issuer 203 sends an authorization response message back to the payment processing network 300 to indicate whether or not the current transaction is authorized (or not authorized). The transaction processing network 26 then forwards the authorization response message back to the acquirer 202. The acquirer 202 then sends the response message back to the service provider 201.

After the service provider 201 receives the authorization response message, the terminal 400 at the service provider 201 may then provide the authorization response message for the user. The response message may be displayed by the terminal 400, or may be printed out on a receipt.

At the end of the day, a normal clearing and settlement process can be conducted by the payment processing network 300. A clearing process is a process of exchanging financial details between and acquirer and an issuer to facilitate posting to a user's payment account and reconciliation of the user's settlement position.

Some of the embodiments described below may use a payment processing system like the one described above, or any suitable combination of components in the payment processing system.

Figure 3:
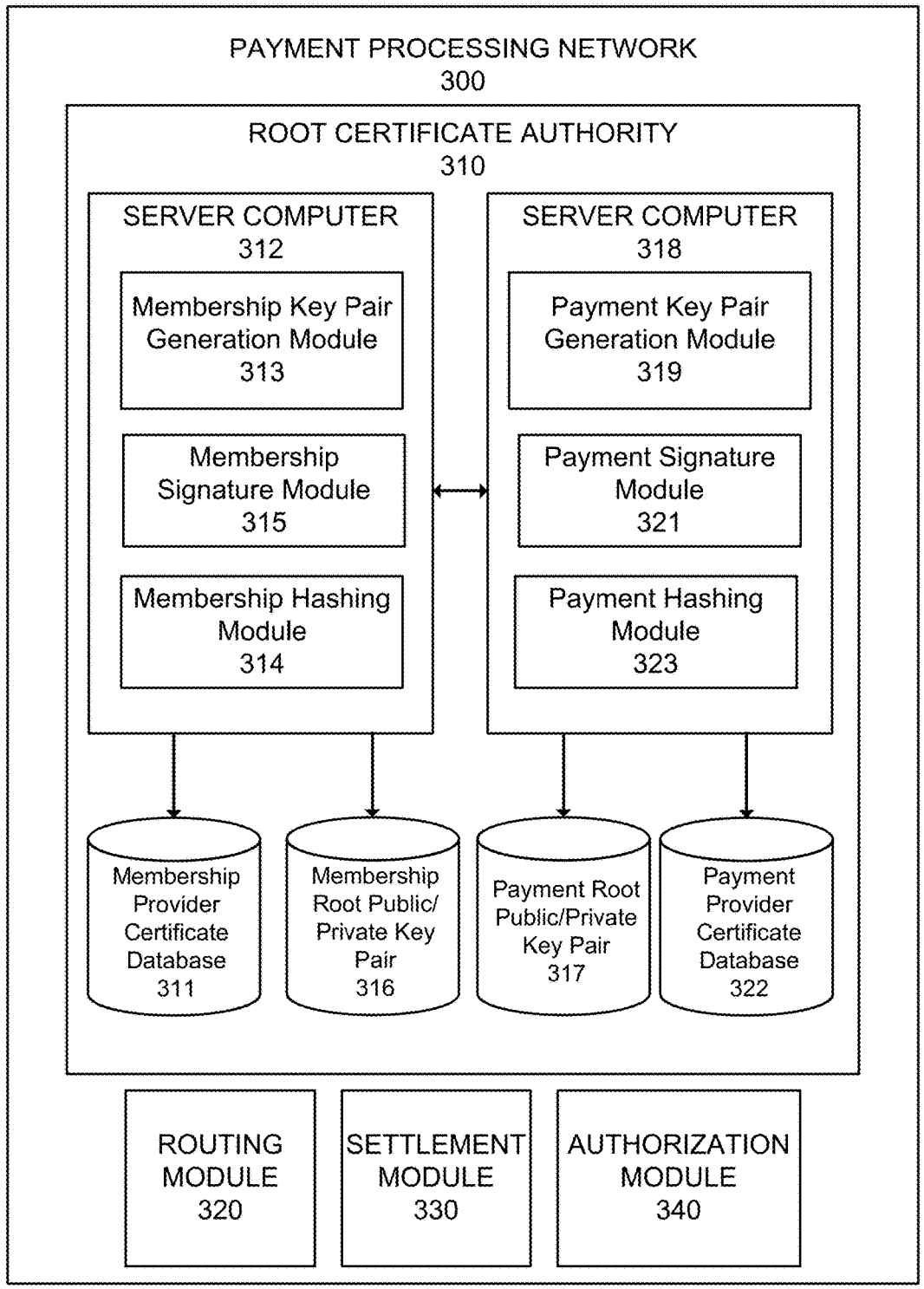
FIG. 3 illustrates a payment processing network in one possible embodiment of the invention.

FIG. 3 illustrates a payment processing network 300 in one possible embodiment of the invention. The payment processing network 300 includes modules for routing 320, settlement 330, and authorization 340. These modules are designed to operate in the manner described in FIG. 2. Payment processing network 300 also includes a root certificate authority 310.

In various embodiments, root certificate authority 310 may be implemented using the same set of server computers as routing module 320, settlement module 330, or authorization module 340. In other embodiments, root certificate authority may be implemented using a different set of server computers.

In various embodiments, Root certificate authority 310 may use a standard communications network used by payment processing institutions, such as VisaNet. In alternate embodiments, root certificate authority 310 may be accessible through general purpose networks, such as a local-area network (LAN), wide-area network (WAN), or the internet. In some embodiments, the root certificate authority may not directly be accessed by requesting entities, but rather must go through an intermediary process to ensure security.

Root certificate authority 310 may be comprised of two server computers 312 and 318, one responsible for issuing membership provider certificates, the other responsible for issuing payment provider certificates. Accordingly, server computer 312 contains membership key pair generation module 313, membership hashing module 314, and membership signature model 315. Membership key pair generation module 313 is configured to generate a cryptographic key pair for a membership provider in case the membership provider does not generate one. Membership hashing module 314 may be used to generate hashes of data to use as part of various cryptographic processes. Membership signature module 315 may be used to sign membership provider certificates. Server computer 312 also includes a membership provider certificate database 311, which includes membership provider certificates issued by the root certificate authority 310. Server computer 312 further includes a membership root public/private key pair 316. The private key of the key pair 316 is used to sign membership provider certificates.

Server computer 318 is responsible for issuing payment provider certificates. Accordingly, server computer 318 contains payment key pair generation module 319, payment hashing module 323, and payment signature model 321. Server computer 318 also contains a payment provider certificate database 317, which includes membership provider certificates issued by the root certificate authority 310, and a payment root public/private key pair 322. The functionality of these elements is analogous to the aforementioned membership-oriented elements, but instead oriented towards payment providers.

Figure 4:
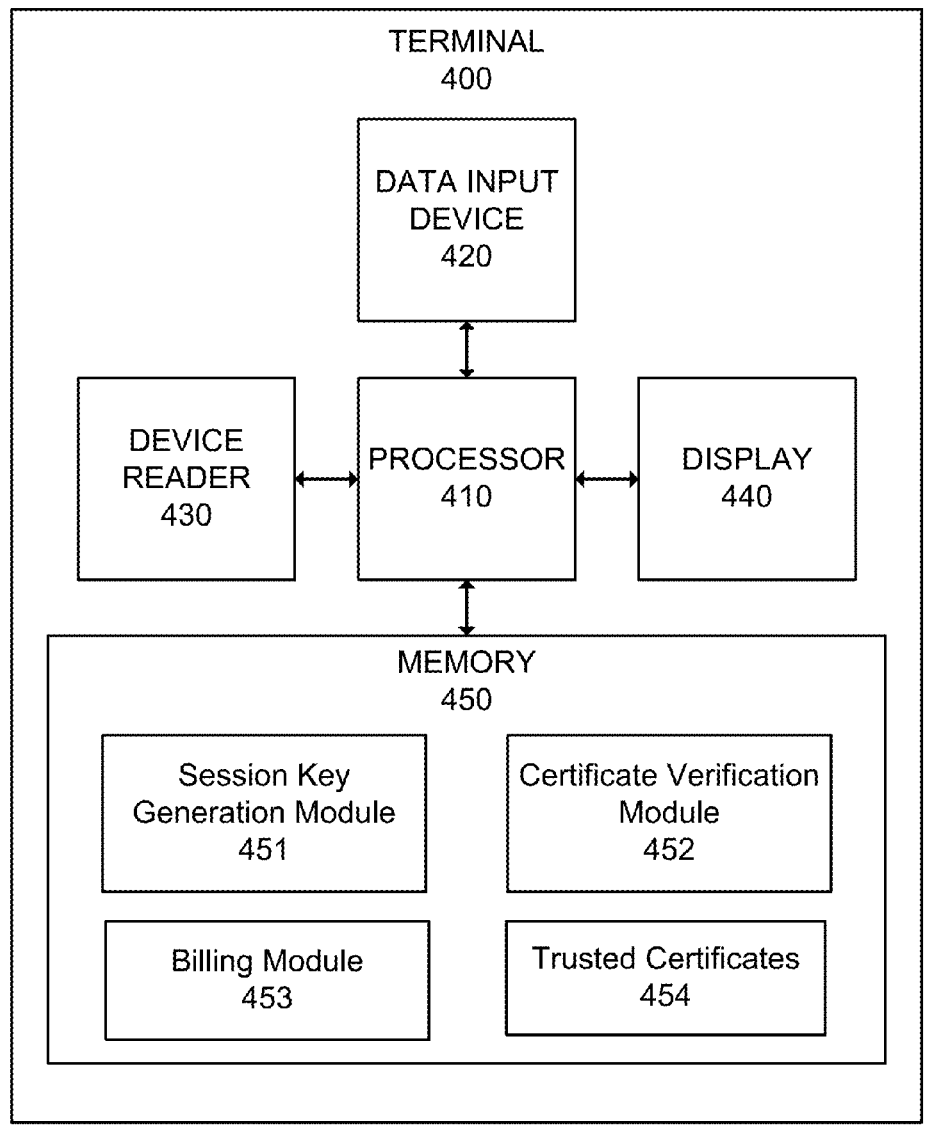
FIG. 4 illustrates a typical terminal apparatus used in embodiments of the invention.

FIG. 4 illustrates a typical terminal apparatus used in embodiments of the invention. Terminal 300 comprises a processor 410, a data input device 420, a device reader 430, a display 440, and a computer-readable memory 450.

Data input device 420 may be any device that accepts input from a user. Examples may include a keyboard, keypad, mouse, or biometric reader. Display 440 may be any device that shows information to a user. Examples may include an LCD screen, CRT monitor, or seven-segment display. Device reader 430 may be any interface operable to communicate with a multi-purpose device (not shown). Device reader 430 may use, for example, Ethernet, Bluetooth, near-field communications (NFC), or other networking method.

Memory 450 may be any magnetic, electronic, optical, or other computer-readable storage medium. Memory 450 contains session key generation module 451, certificate verification module 452, billing module 453, and one or more trusted certificates 454.

Session key generation module 451 is configured to generate session keys for use in communication between the terminal and a multi-purpose device. In various embodiments, generated session keys may be any symmetric encryption algorithm, such as AES, Blowfish, DES, Triple DES, Serpent, and Twofish.

Billing module 453 is configured to generate a calculated billing amount for a transaction between a service provider and a user, and perform a payment transaction for the calculated amount using payment attributes stored on a multi-purpose device. In various embodiments, the billing amount may be dependent on the transaction and member attributes read from a multi-purpose device.

Trusted certificates 454 include one or more trusted root certificate authority certificates. In embodiments of the invention, trusted certificates may be pre-loaded onto terminal 300 by the manufacturer, distributor, acquirer, or software vendor. Trusted root certificate authorities may be operated by trusted financial entities such as organizations operating payment processing networks.

Figure 5:
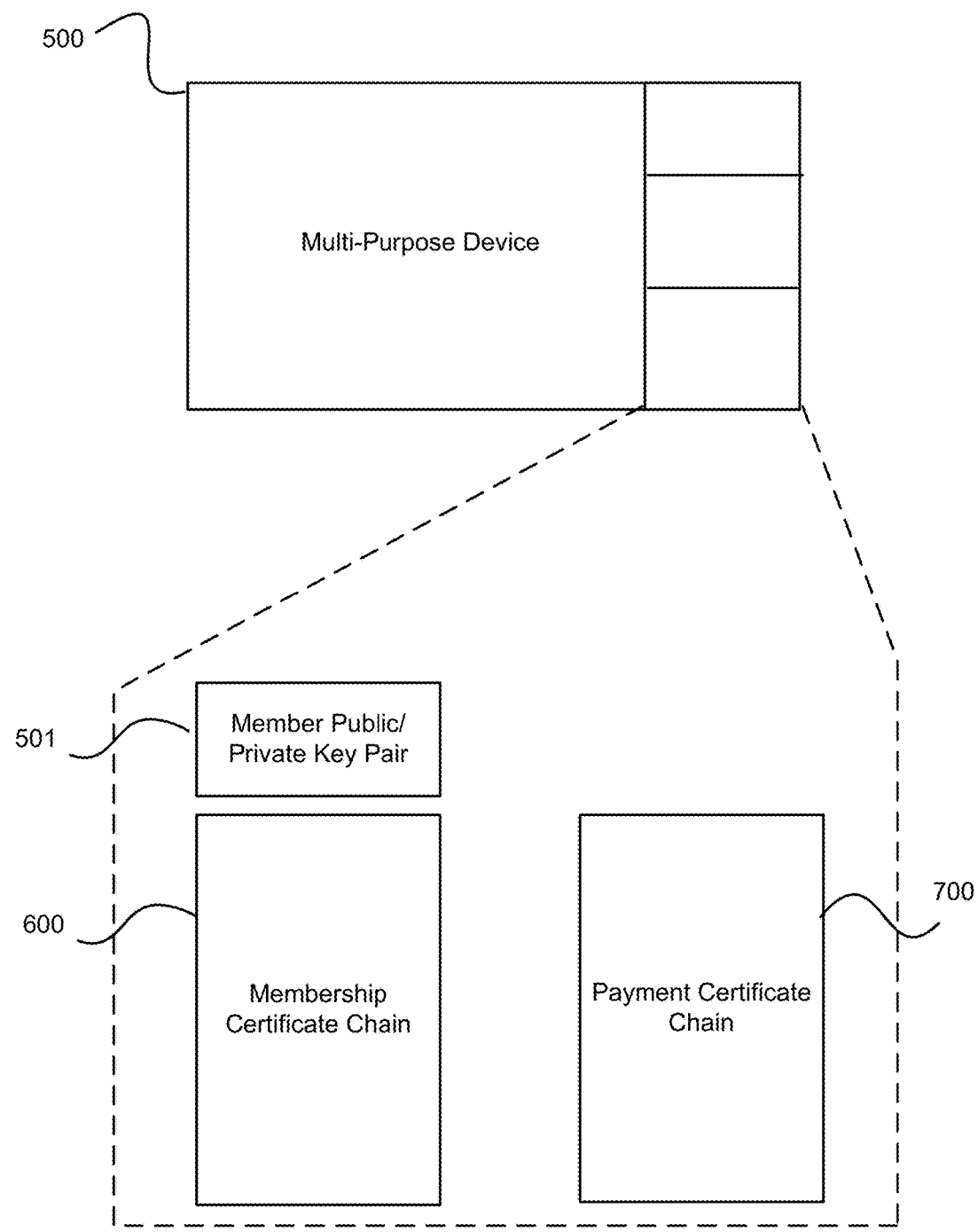
FIG. 5 illustrates one embodiment of a multi-purpose device.

FIG. 5 illustrates one embodiment of a multi-purpose device 500. In the illustrated embodiment, the multi-purpose device 500 is a smart-card. In alternate embodiments, multi-purpose device 500 may be a desktop, laptop, mobile phone, tablet, wearable computer, or any other suitable device for storing member certificate chain 600 and payment certificate chain 700. Multi-purpose device 500 may communicate via a wired or wireless medium, such as NFC, Bluetooth, WiFi, USB, and Ethernet. Multi-purpose device 500 may include a storage medium containing one or more membership certificate chains 600 and a payment certificate chain 700. It may be understood that the term "device" may be used to describe a multi-purpose device. Associated with member certificate chain 600 is a member public/private key pair 501, which is also stored on the device. In general, data may be loaded onto multi-purpose device 500 by one or more of the membership provider, payment provider, certificate authority, terminal, or other party.

Figure 6:
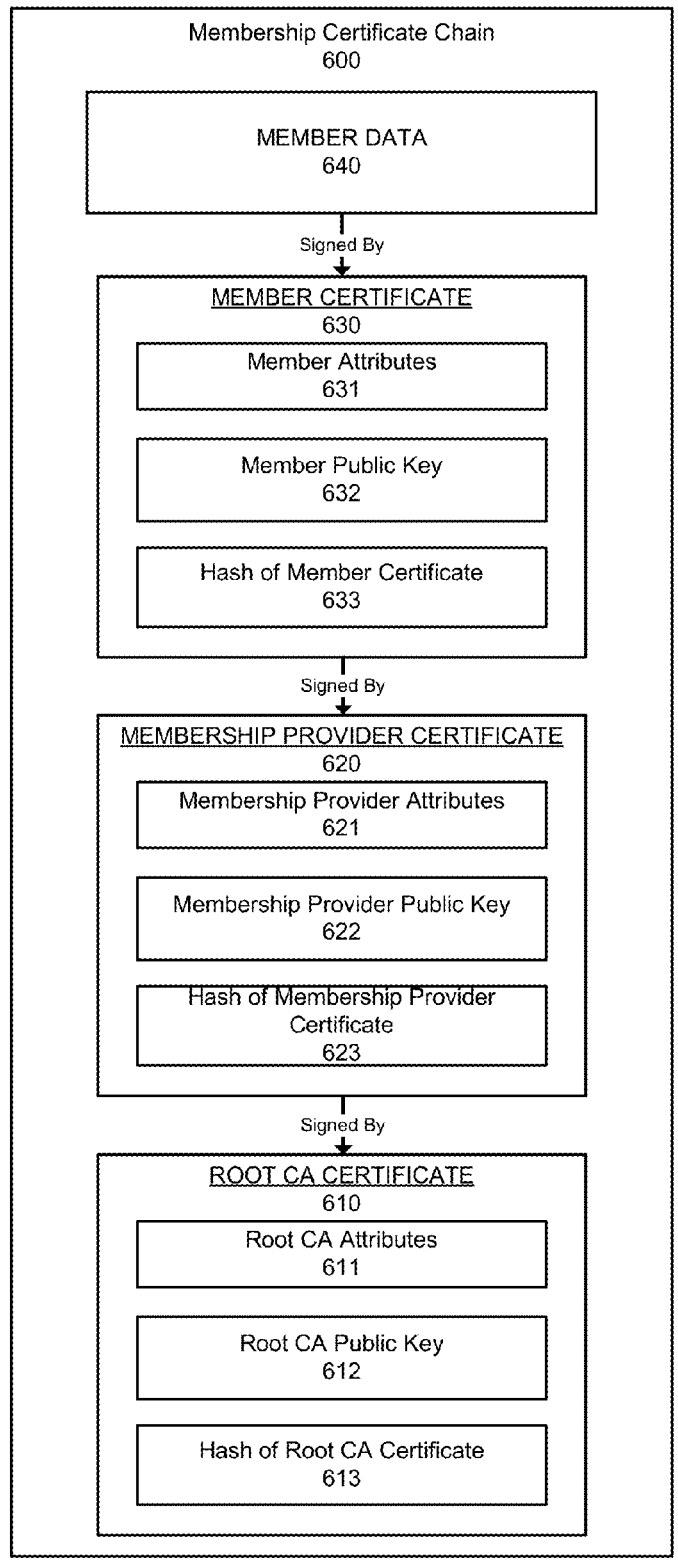
FIG. 6 is an exemplary diagram illustrating the structure of a member certificate chain.

FIG. 6 is an exemplary diagram illustrating the structure of a member certificate chain 600. In the illustrated embodiment, the member certificate chain 600 includes three certificates: root CA certificate 610, membership provider certificate 620, and member certificate 630. In one embodiment, membership certificate chain 600 may also include member data 640.

Root CA certificate 610 is a self-signed certificate representing the identity of a root certificate authority. Root CA certificate 610 may include one or more root CA attributes 611, such as a legal name of the CA, a serial number of the certificate, a valid-from and valid-to date for the certificate, permissions assigned to the CA, etc. Root CA certificate 610 also includes a root CA public key 612. Root CA public key 612 may be in any asymmetric encryption format, such as RSA, or DSA. Root CA certificate 610 also includes a hash of one or more fields in the root CA certificate 613. Any suitable hashing algorithm may be used, such as MD5, SHA-1, SHA-2, or SHA-3.

Membership provider certificate 620 is a certificate representing the identity of a membership provider. Membership provider certificate 620 is signed by a private key associated with root CA certificate 610. In addition to the standard certificate attributes, membership provider certificate 620 may include one or more membership provider attributes 621 specific to the type of membership provided. For example, in the case of a healthcare insurance provider, membership provider attributes 621 may further comprise a government-issued insurer identification number, particular regions associated with the insurer (such as states or provinces), and specific contact information for various departments (such as claims, customer service, new registration, etc.).

Membership provider certificate 620 includes a membership provider public key 622 that has a corresponding private key which may be securely stored at the membership provider. Membership provider certificate 620 also includes a hash of one or more fields in the membership provider certificate 623. Membership provider public key 622 and hash of membership provider certificate 623 may be in any suitable format.

Member certificate 630 is a certificate representing the identity of a member in an organization. Member certificate 630 is signed by a private key associated with the membership provider certificate 620. Member attributes 631 may comprise standard certificate attributes and member attributes specific to the member. Member attributes 631 may generally include details regarding the member in the organization, such as benefits or perks associated with the member, organization activity associated with the member, a member's role in the organization, etc. For example, in the case of a customer insured by a healthcare insurance provider, member attributes 631 may further comprise a list of approved procedures, co-pays associated with the procedures, a list of approved healthcare providers, etc. Member attributes 631 may also include identification attributes which may be used to establish the identity of the member. In various embodiments, identification attributes may include a legal name of the member, address of the member, password or hash thereof assigned to the member, biometric data of the member, etc.

Member certificate 630 may also include a member public key 632. As described in more detail below, while discussing the member data 640, the member public key belongs to the public-private key pair used for securely managing user data. Member certificate 630 also includes a hash of one or more fields in the member certificate 633. Member public key 632 and hash of member certificate 633 may be in any suitable format.

Member certificate chain 600 further comprises member data 640. Member data 640 may include any data signed, encrypted, or otherwise secured by the member private key. Since the member private key is stored on the multi-purpose device, member data 640 may be written to the device after the member certificate 630 has already been signed by the membership provider certificate authority and loaded onto the device. Member data 640 may be used, for example, by a terminal. The device may send member data 640 using the member private key. The terminal may then decrypt the data by using the member public key.

For example, in the case of a customer insured by a healthcare insurance provider, member data 640 may include medical records information such as recently discovered drug allergies, recently performed procedures, blood test results, latest blood pressure readings, immunization status, current prescriptions, and progress notes entered by healthcare providers such as doctors, nurses, etc. If the member is a bicyclist in a bicycle club, the member data may include information about the bicycles used by the bicyclist, recent course completion times, or the bicyclist's current rank. Multi-purpose device 500 may be operable to read and write member data 640.

Figure 7:
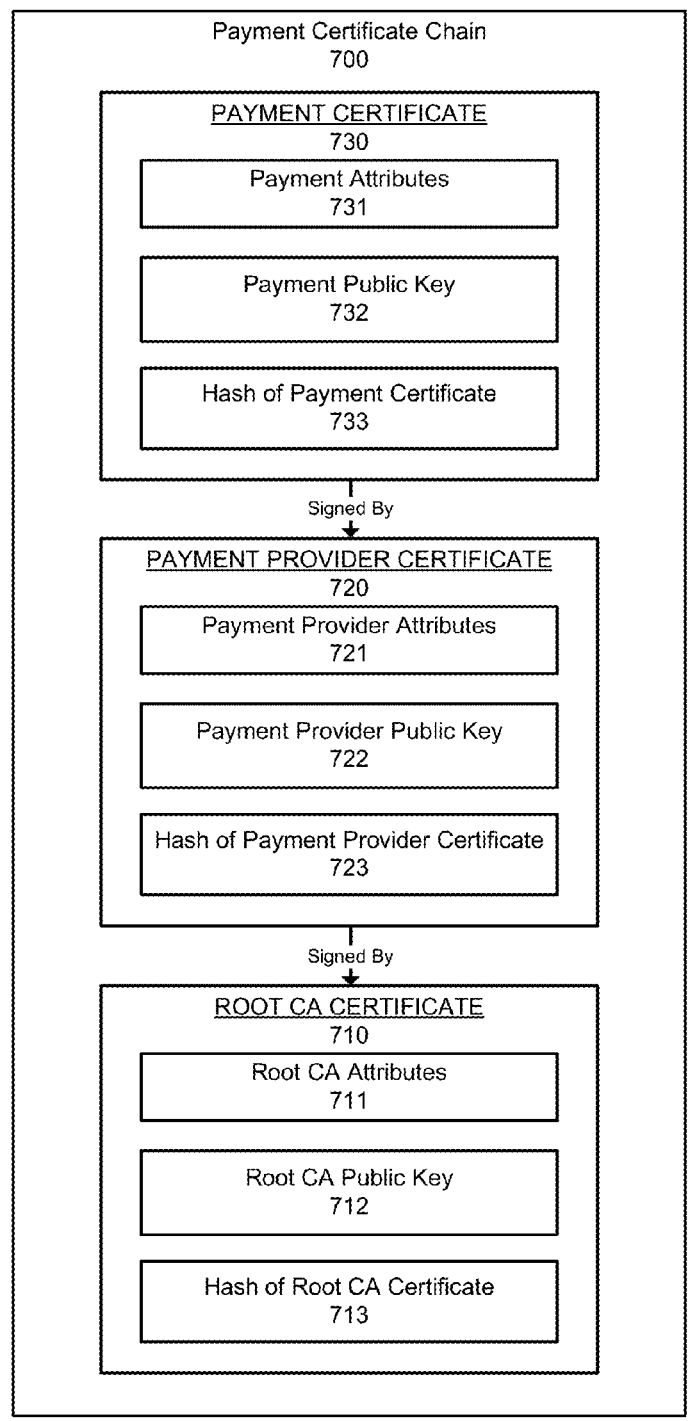
FIG. 7 is an exemplary diagram illustrating the structure of a payment certificate chain.

FIG. 7 is an exemplary diagram illustrating the structure of a payment certificate chain 700. In the illustrated embodiment, the payment certificate chain 700 includes three certificates: root CA certificate 710, payment provider certificate 720, and payment certificate 730.

Root CA certificate 710 is a self-signed certificate representing the identity of a root certificate authority. Root CA certificate 710 may be the same certificate as root CA certificate 610, or may belong to a different certificate authority. The contents of the root CA certificate—root CA attributes 711, root CA public key 712, and hash of fields in the root CA certificate 713 are similar to those aforementioned in FIG. 6.

Payment provider certificate 720 is a certificate representing the identity of a payment provider. Payment provider certificate 720 is signed by a private key associated with root CA certificate 710. In addition to the standard certificate attributes, payment provider certificate 720 may include one or more payment provider attributes 721 specific to the entity providing payment services. For example, in the case of a credit card issuer, payment provider attributes 721 may further comprise an account number prefix associated with the issuer, a routing number associated with the issuer, a classification of the payment method, interchange rates associated with the issuer, and contact information for the issuer.

Payment provider certificate 720 includes a payment provider public key 722, whose corresponding private key is stored at the payment provider. Payment provider certificate 720 also includes a hash of one or more fields in the payment provider certificate 723.

Payment certificate 730 is a certificate representing the identity of a payment account. Payment certificate 730 is signed by a private key associated with the payment provider certificate 720. Payment certificate 720 may contain one or more payment attributes 731 such as a personal account number (PAN), an account expiration date, a card verification value (CVV), routing number, or other information which may be used to effect payment from or to a financial account. The payment certificate 730 also includes a payment public key 732 and a hash of the payment certificate 733.

II. Exemplary Methods

Figure 8:
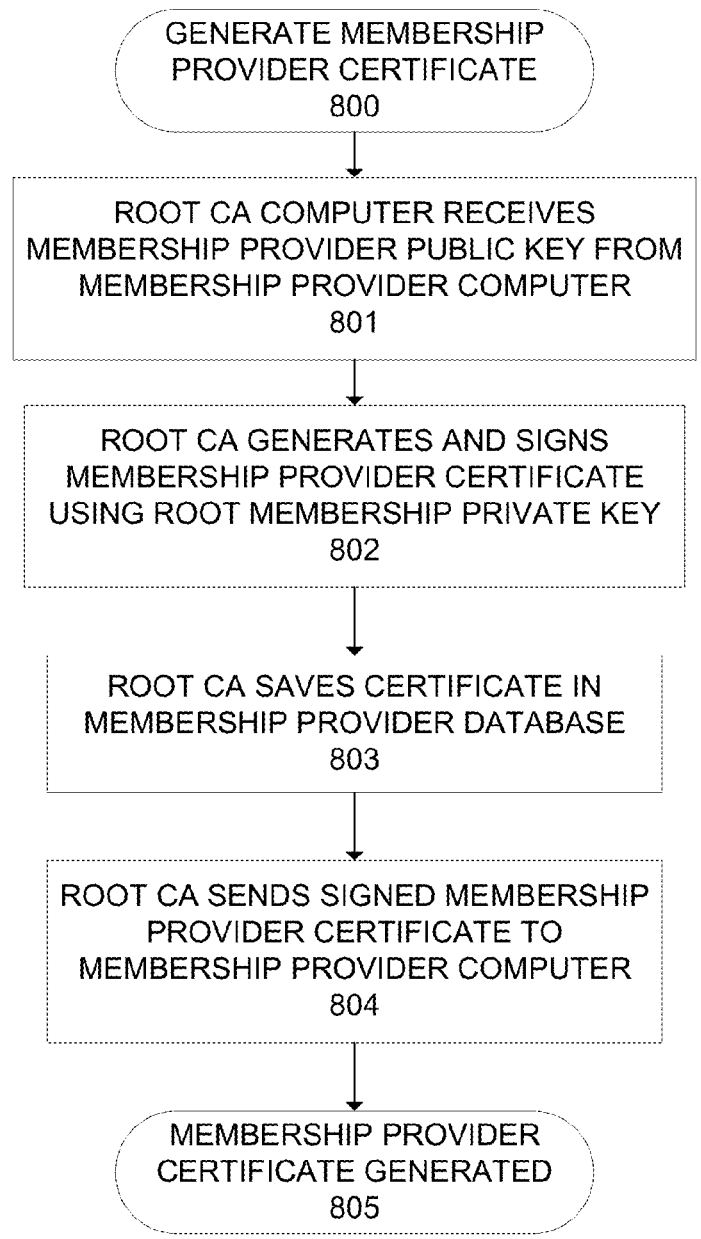
FIG. 8 illustrates an exemplary use case flows for generating and signing a membership provider certificate by a root certificate authority.

FIG. 8 illustrates exemplary use case flow for generating and signing a membership provider certificate by a root certificate authority. In some embodiments of the invention, the flow presented in FIG. 8 may be performed as part of a membership provider registration process with the certificate authority or payment processing network. After the flows complete, the membership provider is assigned a certificate that it can subsequently use to sign member certificates.

At step 801, the root certificate authority receives a request from the membership provider for a certificate that includes the membership provider public key. The request may be encrypted, for example using the PKCS #10 or PKCS #7 formats. Prior to or included in the request may be proof of identity provided by the membership provider. In various embodiments of the invention, the root certificate authority may require information from the membership providers to ensure that a membership provider certificate is not issued to an incorrect party.

At step 802, the root certificate authority generates and signs the membership provider certificate using a root membership private key. The generated certificate may have one or more data fields defined by the root certificate authority based on characteristics of the membership provider, such as a legal name, identification number, category of membership provider, etc. In alternate embodiments, the membership provider certificate may be generated as an unsigned certificate at the membership provider and only sent to the root certificate authority for signature. In such embodiments, some or all data fields in the certificate may be defined by the membership provider.

The root membership private key may be a private key in a public/private key pair stored by the root certificate authority. The root membership private key may be used to sign all membership provider certificates, and therefore represent a common trusted certificate authority. Accordingly, the root membership private key may be stored in terminals operated by service providers to enable the terminals to assess the validity of membership provider without requiring a network connection or verification of further certificates.

At step 803, the root certificate authority saves the generated membership provider certificate in the membership provider database. Later queries to the membership provider database may, for example, be used to determine a list of valid membership providers, or check if a particular membership provider is currently valid. The membership provider database may also be used to revoke a certificate by flagging the certificate in the database as invalid.

At step 804, the root certificate authority sends the signed membership provider certificate to the membership provider computer. The certificate may be sent using any suitable transmission format, such as PCKS #7 or PKCS #10.

Figure 9:
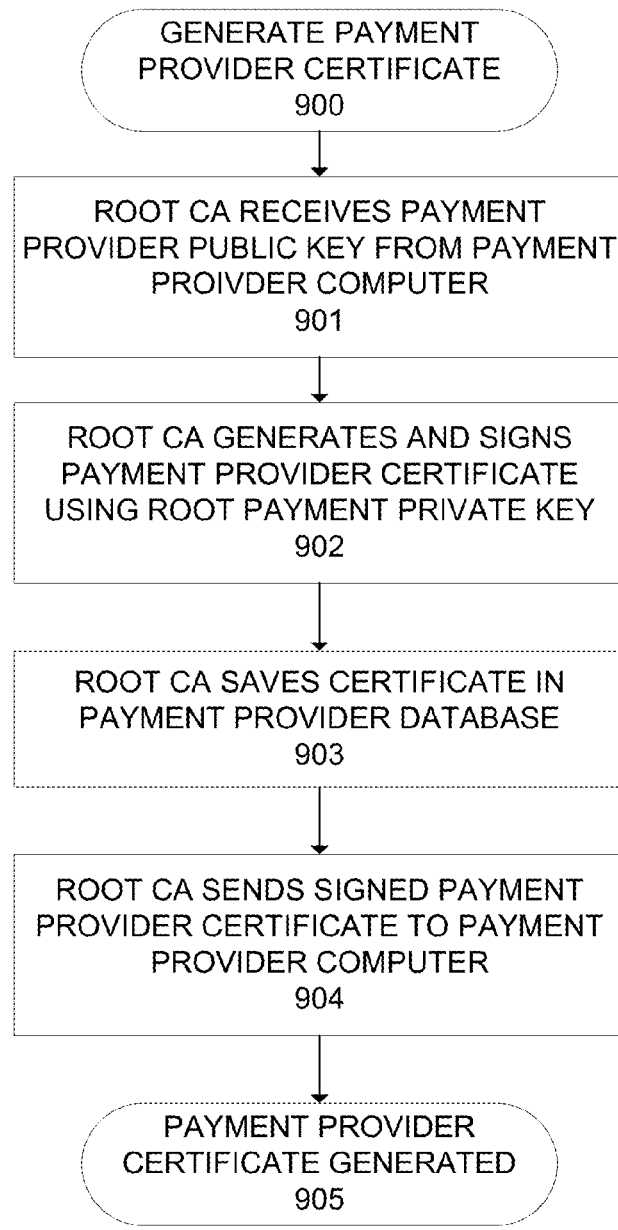
FIG. 9 illustrates an exemplary use case flows for generating and signing a payment provider certificate by a root certificate authority.

FIG. 9 illustrates an exemplary use case flow for generating and signing a payment provider certificate by a root certificate authority. In embodiments of the invention, steps 900-905 may be performed in a similar manner to steps 800-805 as shown in FIG. 8. For example, the root certificate authority may use a common root payment private key to sign all payment provider certificates, and store all signed certificates in a payment provider database. In some embodiments of the invention, the root payment private key and the root membership private key may be the same key.

Figure 10:
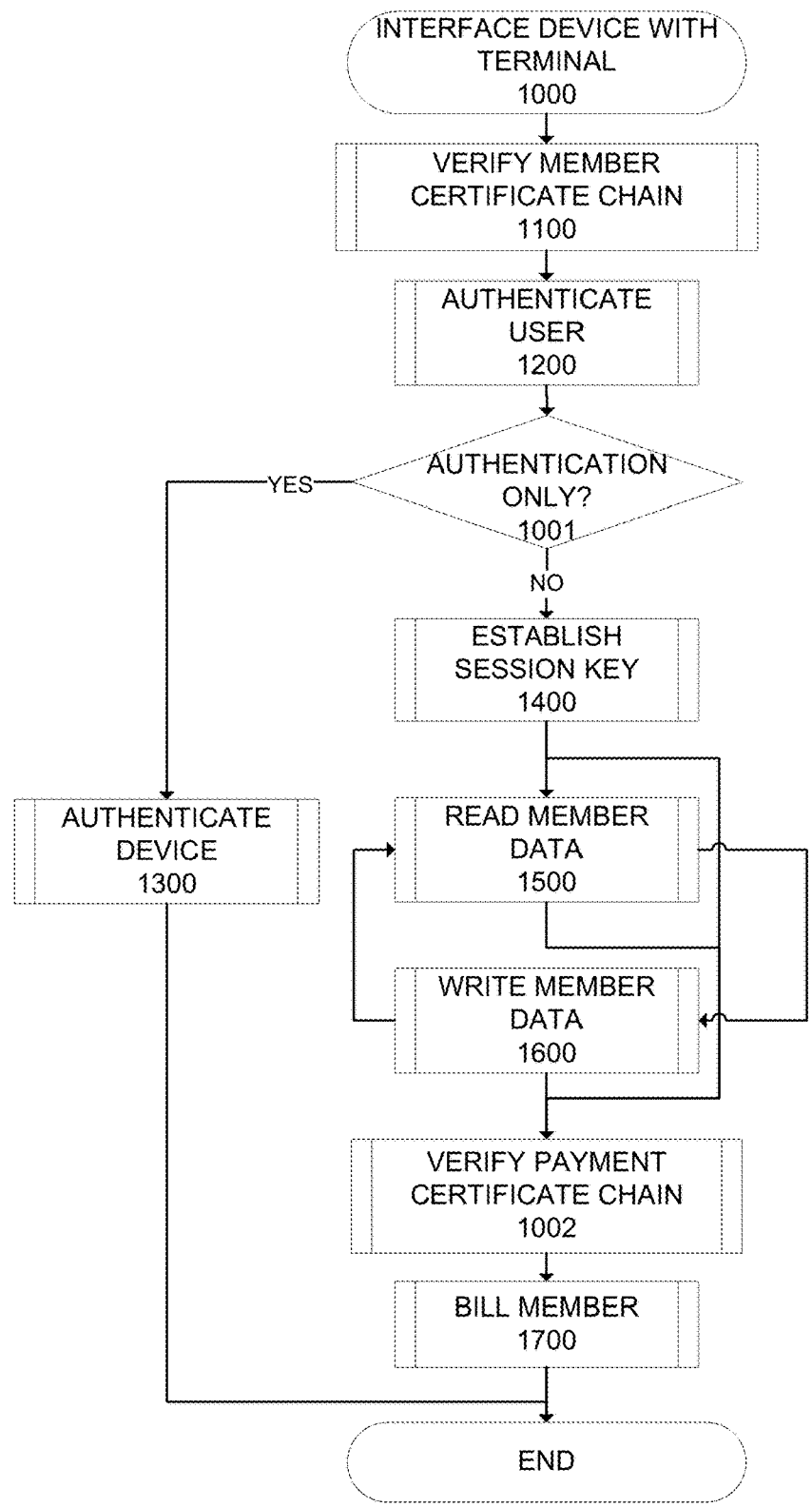
FIG. 10 is a flowchart illustrating the order in which various processes which may be performed using the multi-payment device.

FIG. 10 is a flowchart illustrating the order in which various processes which may be performed using the multi-payment device in order to interface device with terminal 1000, verify member certificate chain 900, authenticate device 1200, establish session key 1300, authenticate user 1200, read member data 1500, write member data 1600, verify the payment certificate chain 1001, and bill member 1700. The processes in FIG. 10 are further described in FIGS. 9-17.

At step 1000, the multi-purpose device interfaces with the terminal. In a typical embodiment, a user initiates the transaction after receiving goods or services from the service provider. The user may tap, swipe, or pair the multi-purpose device with the terminal. In a typical embodiment, the multi-purpose device and terminal may establish a wired or wireless connection over which data may be sent.

After a connection has been established between the device and terminal, the terminal performs process 1100 to verify the member certificate chain stored on the device. The purpose of process 1100 is to ensure the authenticity of the certificate authority certificate, the membership provider certificate, the member certificate, the member data, and data stored therein.

Once the member certificate chain has been successfully verified (process 1100), the user is authenticated through process 1200. The service provider reads member data from the multi-purpose device, including identification attributes. The service provider then uses the identification attributes to verify the identity of the user, for example by requesting government-issued ID from the user and corroborating it with the identification attributes. Alternatively, or in addition to the service provider's visual verification of the user, the terminal may use biometric data to authenticate the user as further described in FIG. 12.

In various use cases, a service provider may want to establish a secure connection between the terminal and the multi-purpose device. At decision step 1001, the terminal may determine if an authentication-only procedure is to be followed. If not, process 1200 may be performed. At process 1200, the terminal and device establish a shared session key for further communication. The session key may be generated by the terminal and sent to the device encrypted by the member public key. The device may then decrypt the encrypted session key using the member private key. This allows all subsequent communication between the terminal and device to be secured from eavesdropping, spoofing, forgery, and other forms of data capture or manipulation.

At process 1500, the terminal reads member data from the device. Member data may be encrypted using the session key and signed using the member private key. The terminal decrypts the member data and verifies the signature to ensure authenticity.

At process 1600, the terminal writes member data to the device. Member data may be encrypted using the session key and/or the member public key.

In various embodiments of the invention, the terminal may read and/or write member data repeatedly using the multi-purpose device.

At step 1001, the terminal verifies the payment certificate chain of the multi-purpose device. The verification process may be similar to process 1100 for verifying the member certificate chain. The purpose of verifying the payment certificate chain is to ensure the payment attributes enclosed therein are accurate.

At step 1700, the terminal bills the member using the payment attributes stored on the payment certificate chain. An amount to be billed may depend on at least the transaction with the service provider, member attributes, and/or member data. Optionally, the service provider or terminal may indicate to the user the amount to be billed. Once billing is completed successfully, the transaction using the multi-purpose device ends (step 1002).

In various use cases, a service provider may want to simply judge the validity of a multi-purpose device without calculating a billing amount or writing member data. At decision step 1001, the terminal may determine if an authentication-only procedure is to be followed. If so, at process 1300 the terminal authenticates the device in a standalone procedure. The process involves a terminal generating a random number, encrypting the random number using the member public key, and sending the random number to the device. The device then decrypts the random number, appends member data, encrypts the appended data using the member private key, and sends the data to the terminal. The terminal may verify the contents of the returned data by decrypting the data using the member public key and ensuring that the correct random number is included with the data. Since the member private key would be required to successfully decrypt and re-encrypt the random number, and only the multi-purpose device should have access to the member private key, the terminal may consider the device as authentic.

Figure 11:
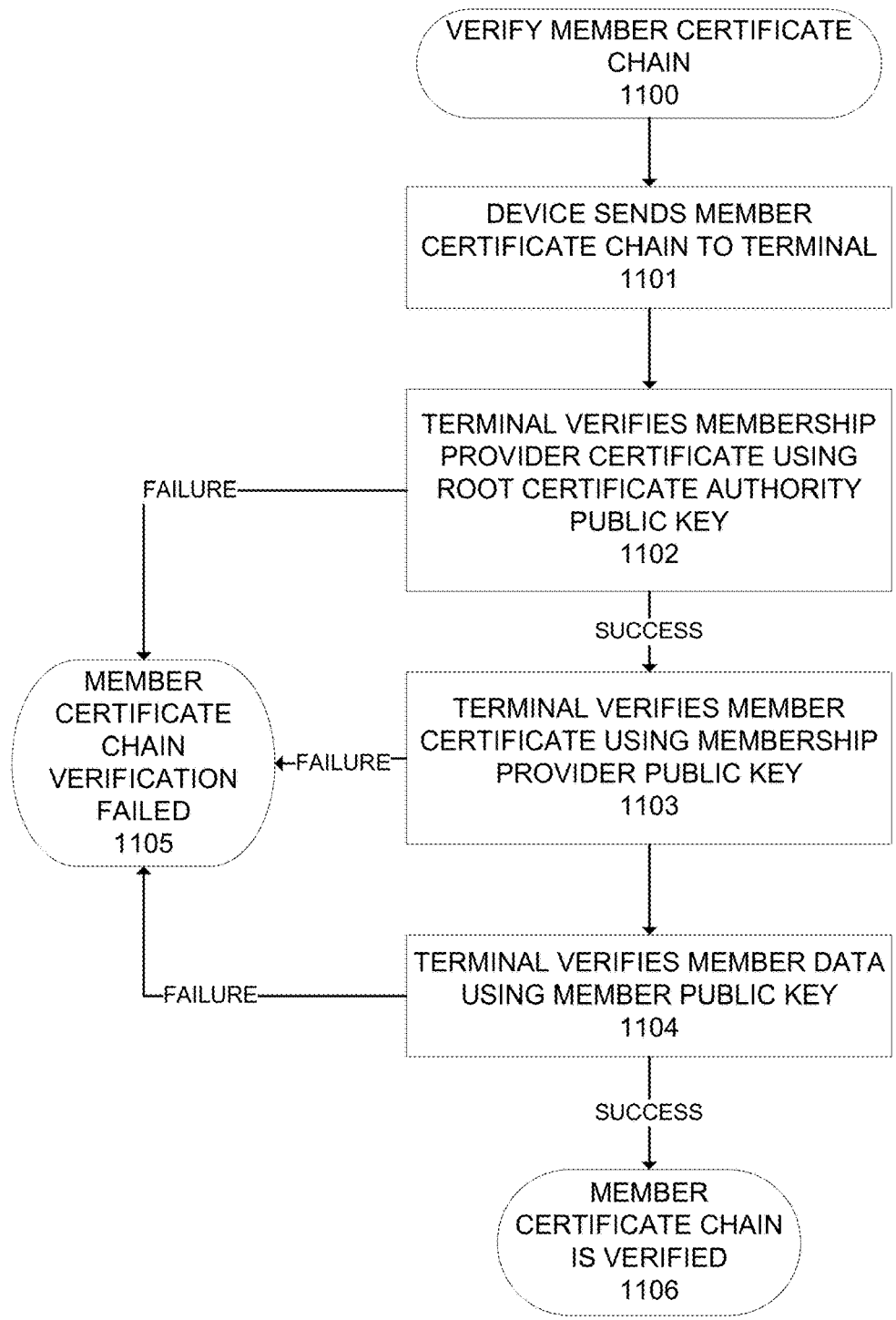
FIG. 11 illustrates an exemplary use case flow for digitally verifying the contents of a member certificate chain.

FIG. 11 illustrates an exemplary use case flow for digitally verifying the contents of a member certificate chain. In embodiments of the invention, the flow in FIG. 11 is performed after a connection has been established between a terminal and a multi-purpose device.

At step 1101, the multi-purpose device sends a member certificate chain to the terminal. The member certificate chain may be sent as a single binary file, or as a sequence of individual certificates and member data. In various embodiments, to reduce the amount of data transmitted, the root CA certificate may not be transmitted.

At step 1102, the terminal digitally verifies the membership provider certificate using the root certificate authority public key. In some embodiments of the invention, a certificate corresponding to the root certificate authority public key may be retrieved from the set of trusted certificates stored at the terminal. The root certificate authority public key may be extracted from the retrieved certificate. In other embodiments, the root CA public key may be requested from a computer network, such as the internet.

In some embodiments, to verify the membership provider certificate, the terminal extracts the signature from the membership provider certificate. The terminal decrypts the signature using the root CA public key, and compares the decrypted value to an expected value. If the decrypted value and expected value match, the verification is successful and moves on to step 1103. Otherwise, the verification process terminates and step 1105 is performed.

At step 1103, the terminal digitally verifies the member certificate using the membership provider public key. The membership provider public key is extracted from the membership provider certificate verified in step 1102. In general, the process for verifying the member certificate signature is similar to the process of verifying the membership provider certificate.

At step 1104, the terminal digitally verifies the member data using the member public key. The member public key is extracted from the member certificate verified in step 1103. In some embodiments, the member data is secured by a signature using the member private key. In such embodiments, the member data may be verified by the terminal by verifying the signature using the member public key, similarly to steps 1102 and 1103. In other embodiments, the member data may be encrypted using the member private key. In such embodiments, the member data may be verified by the terminal by decrypting the member data using the member public key and comparing it to an acceptable value. If the values match, the member data is verified.

If any of steps 1102, 1103, or 1104 are not completed successfully, the member certificate chain verification fails and step 1105 is performed. In step 1105, the terminal may display information regarding the failure to the service provider or user. The terminal may also block further steps from occurring, such as user authentication, reading or writing of member data, or billing of the member. The service provider may also decline to provide goods or services to the user based on the verification failure.

If steps 1102, 1103, and 1104 complete successfully, the member certificate chain may be considered authentic. In step 1106, the terminal may display the verified data to a service provider or user.

Figure 12:
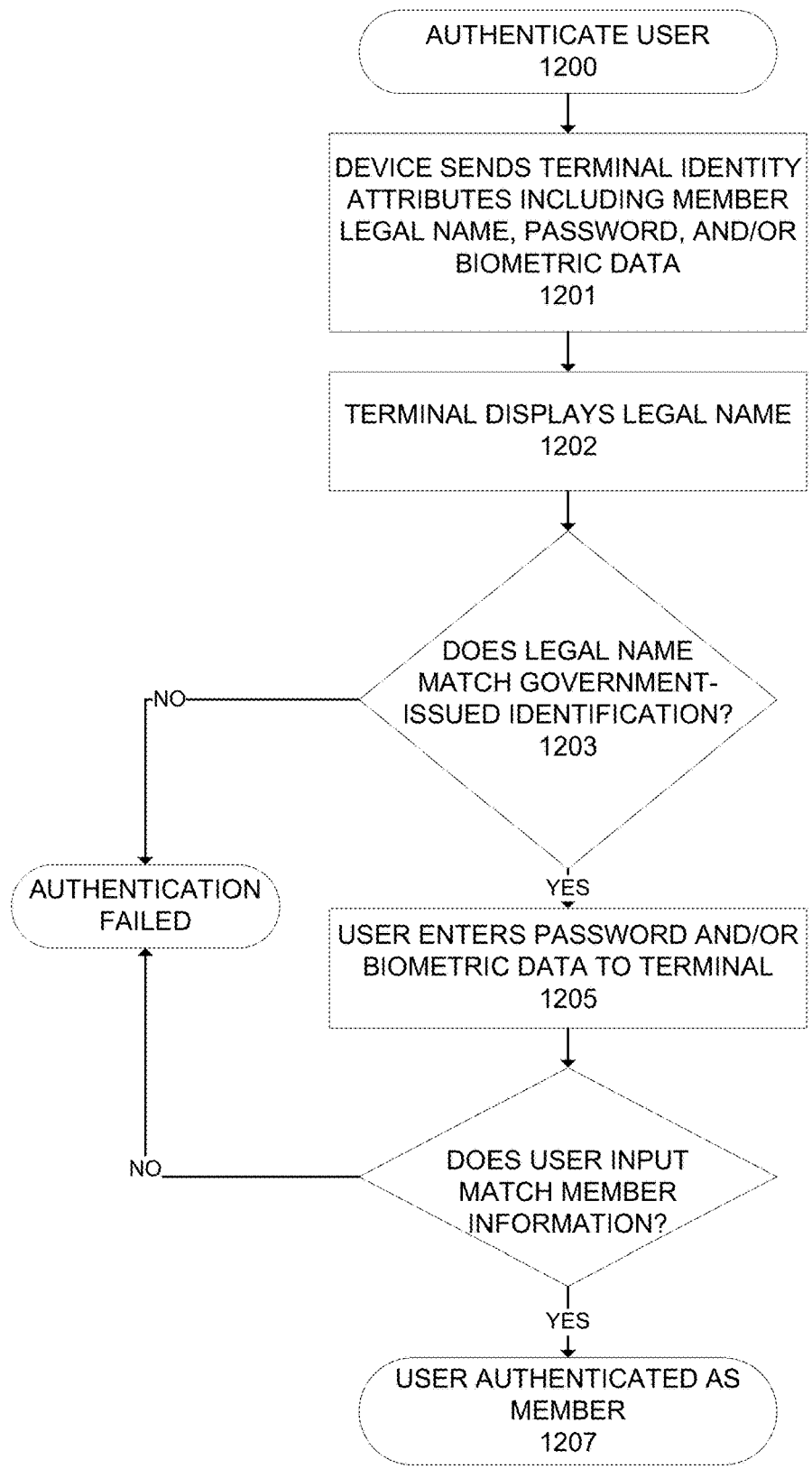
FIG. 12 illustrates an exemplary use case flow for authenticating a user.

FIG. 12 illustrates an exemplary use case flow for authenticating a user. In embodiments of the invention, FIG. 12 may be performed after the member certificate chain is verified to be authentic.

At step 1201, the device sends the terminal identity attributes such as a member's legal name, a member password, or some biometric data associated with the member. In various embodiments, the member password may be hashed, salted, or otherwise obfuscated rather than being stored in plaintext. Biometric data may include photographic data, fingerprint data, retinal scan data, genetic data, or any other biometric data that may be used to identify a user as a particular member.

At step 1202, the terminal displays the member's legal name. At step 1203, the service provider may request a government-issued or other identification from the user. For example, the service provider may require the user to show a driver's license, passport, or student ID card. The service provider may cross-reference the identification with the member's legal name to ensure the user of the multi-purpose card is the member. The service provider may then indicate to the terminal that the identity matches.

In some embodiments of the invention, user may also be required to input data to the terminal (step 1205). For example, the user may be prompted to enter a preset PIN or password, or use a biometric scanner connected to the terminal to generate biometric data. If the user input matches the corresponding identity attribute, the user is considered successfully authenticated. In step 1207, the terminal may display an indication that user authentication is successful.

In alternate embodiments of the invention, any combination of the identity attributes may be used. For example, some embodiments may require no manual verification by the service provider. In one such embodiment, the terminal may authenticate the user solely on the basis of biometric data. This may be useful in automated systems, such as an automated eye exam booth or automated blood pressure both.

Figure 13:
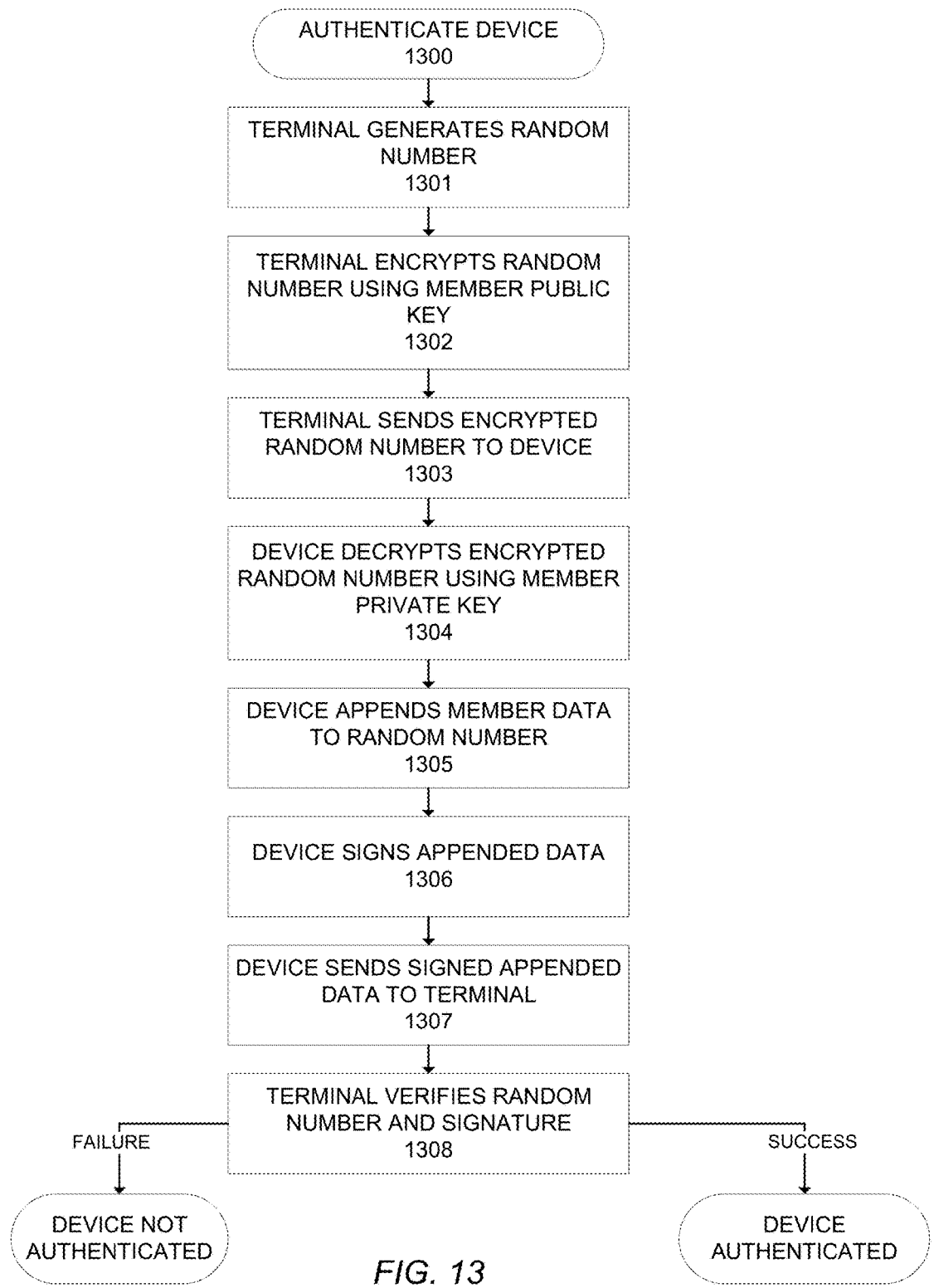
FIG. 13 illustrates an exemplary use case flow for authenticating a device.

FIG. 13 illustrates an exemplary use case flow for authenticating a device. Authenticating a device may be useful in some situations, such as when the service provider wants to verify that a device is authentic before providing goods or services. In such situations, the additional step of establishing a session key may introduce unnecessary overhead. Therefore, in various embodiments, process 1300 may be used to authenticate a device using a procedure that does not require establishing a session key. In a typical embodiment, process 1300 may be performed after verifying the member certificate chain.

At step 1301, the terminal generates a random number. The random number may be of any size. The random number may be generated using any suitable random or pseudorandom means. In alternate embodiments, the certificate may generate any random bit sequence.

At step 1302, the terminal encrypts the random number using the member public key.

At step 1303, the terminal sends the encrypted random number to the multi-purpose device.

At step 1304, the device decrypts the encrypted random number using the member private key.

At step 1305, the device appends member data to the random number.

At step 1306, the device signs the appended data using the member private key.

At step 1307, the device sends the signed appended data to the terminal.

At step 1308, the terminal verifies the appended data and signature. If the random number is the same as the number generated in step 1301, and the signature is verified, then the device is authenticated.

Figure 14:
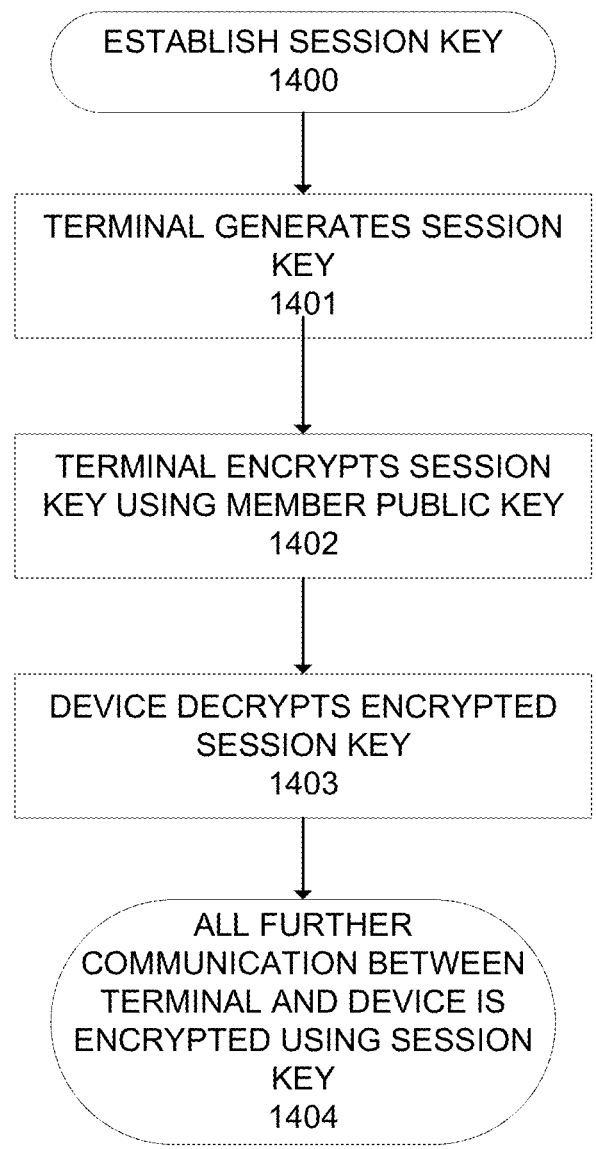
FIG. 14 illustrates an exemplary use case flow for establishing a session key between the terminal and the multi-purpose device.

FIG. 14 illustrates an exemplary use case flow for establishing a session key between the terminal and the multi-purpose device.

At step 1401, the terminal generates a session key. The session key may be any generated using any symmetric encryption algorithm, such as AES, Blowfish, DES, Triple DES, Serpent, and Twofish. The session key may be of arbitrary length.

At step 1402, the terminal encrypts the session key using the member public key. The terminal sends the encrypted session key to the device.

At step 1403, the device decrypts the encrypted session key using the member private key. At step 1404, the device stores the session key, so that any subsequent communication between the terminal and device is encrypted and decrypted using the session key.

Figure 15:
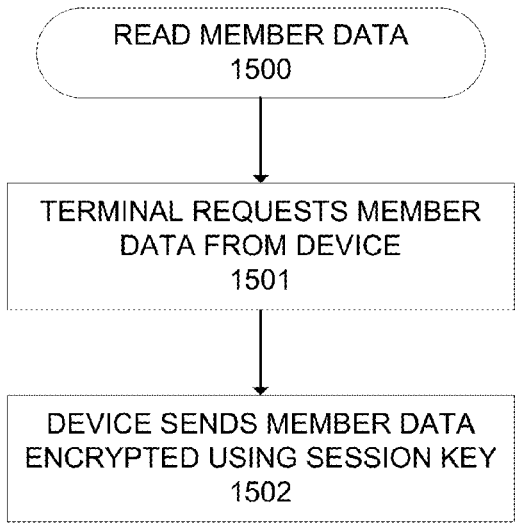
FIG. 15-16 illustrate exemplary use case flows for reading and writing member data.

FIG. 15 illustrates an exemplary use case flow for reading member data by the terminal from the device. In a typical embodiment, process 1500 may performed after verifying the member certificate chain and establishing a session key between the terminal and multi-purpose device. Process 1500 may be performed before or after process 1400.

At step 1501, the terminal requests member data from the device. In typical embodiments, the member data is signed, encrypted, or otherwise secured by the member private key. The request may be for a part or all of the member data.

At step 1502, the device sends the member data to the terminal encrypted by the session key over the communication channel. The terminal may decrypt the data using the session key.

Figure 16:
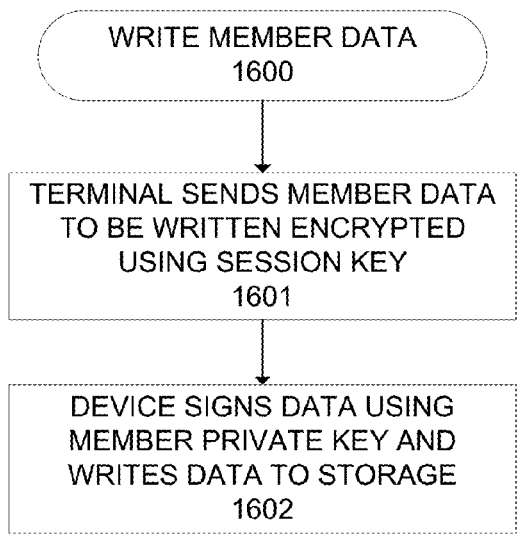

FIG. 16 illustrates an exemplary use case flow for writing member data. In a typical embodiment, process 1400 may performed after verifying the member certificate chain and establishing a session key between the terminal and multi-purpose device. Process 1600 may be performed before or after process 1500.

At step 1601, the terminal sends member data to be written. The member data is encrypted using the session key.

At step 1602, the device receives and decrypts the member data. The device then signs the member data using the member private key and writes the signed data to a storage medium.

Figure 17:
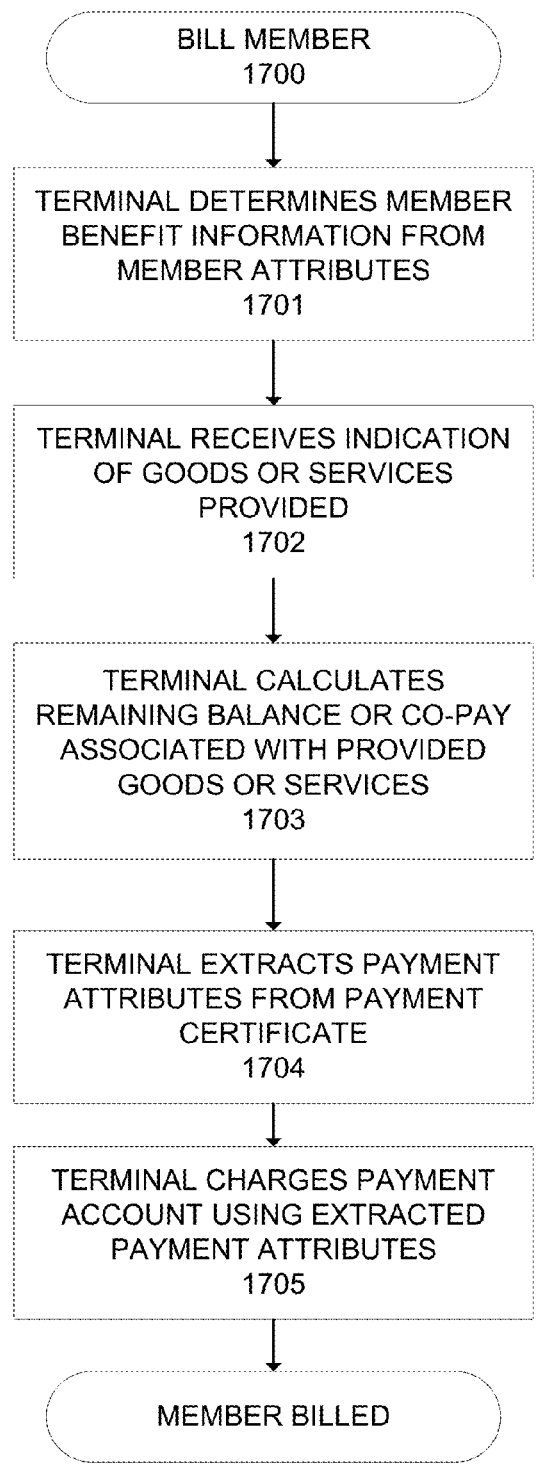
FIG. 17 illustrates an exemplary use case flow for billing a member for a transaction between the service provider and the user.

FIG. 17 illustrates an exemplary use case flow for billing a member for a transaction between the service provider and the user. In a typical embodiment, process 1700 may be performed after verifying the member certificate chain, authenticating the user, and verifying the payment certificate chain. Therefore, before process 1700 begins, the service provider should have assurance that the member attributes and member data stored on the multi-purpose device are authentic, the payment attributes stored on the multi-purpose device are authentic, and the user is the same person or entity as identified on the multi-purpose device.

At step 1701, the terminal determines member benefit information from the member attributes for a member. Member attributes are extracted from the member certificate. Member benefit information may be any information used to determine an adjustment in price to goods or services. In various embodiments, member benefit information may be category based. For example, a restaurant rewards program may qualify the member for a percent discount on certain restaurant types. In other embodiments, member benefit information may be specific to a list of procedures performed. For example, a healthcare insurance plan may specify deductible amounts and co-pays associated with various procedures such as doctor's appointments, blood tests, surgeries, etc.

At step 1702, the terminal receives an indication of goods or services provided by the service provider. The indication may be through, for example, a network query such as a database access, manual entry by the service provider, or a barcode reader. In some embodiments of the invention, member data stored on the multi-purpose device may be used.

At step 1703, the terminal calculates a remaining balance or co-pay associated with the provided goods or services. In some embodiments, the calculation may involve tabulating a cost associated with the goods, then providing a discount based on the member benefit information. In other embodiments, the member benefit information may determine the cost of the goods or services.

At step 1704, the terminal extracts payment attributes from the payment certificate.

At step 1705, the terminal charges a payment account associated with the payment attributes for the remaining balance or co-pay. If the billing procedure is successful, the terminal may notify the service provider and/or user.

The above described processes may be performed in any order, any number of times, not necessarily the order as presented in FIG. 10. For example, in one possible flow, the terminal may verify the member certificate chain (process 1100), authenticate the user (process 1200), establish a session key (process 1400), and write member data (process 1600), but not verify the payment certificate chain (process 1001) or bill the member (process 1700).

Figure 18:
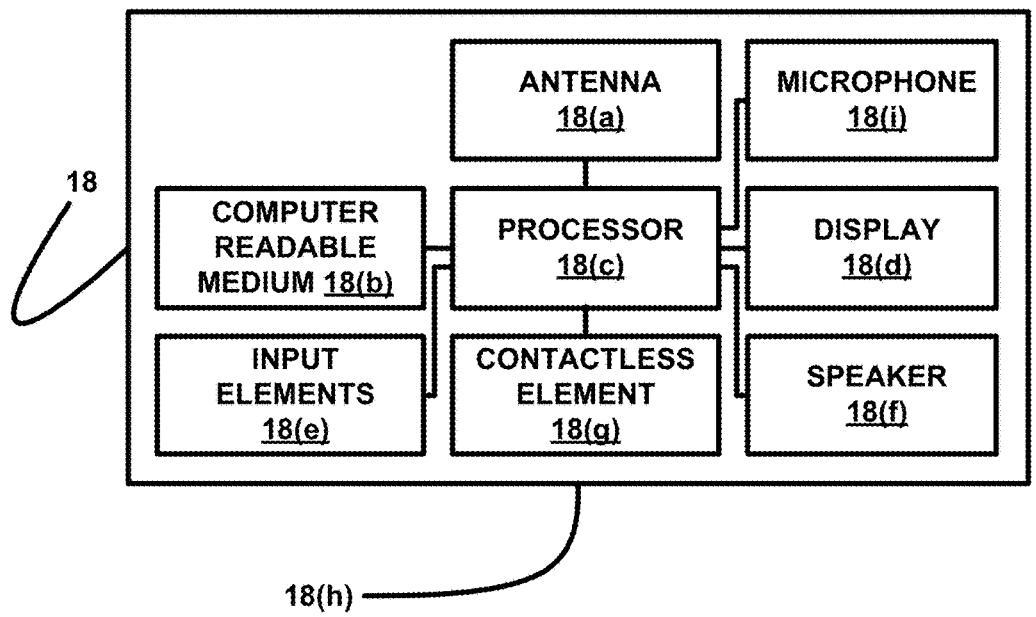
FIG. 18 shows a block diagram of a multi-purpose device in the form of a mobile device that may be used in embodiments of the invention.

The multi-purpose device described for embodiments of the invention may be a mobile phone, tablet, smart card, wearable computer, or any other suitable device. FIG. 18 shows a block diagram of a multi-purpose device in the form of a mobile device such as a phone 18 that may be used in embodiments of the invention. The exemplary wireless phone 18 may comprise a computer readable medium and a body as shown in FIG. 18. The computer readable medium 18(b) may be present within the body 18(h), or may be detachable from it. The body 18(h) may be in the form a plastic substrate, housing, or other structure. The computer readable medium 18(b) may be in the form of (or may be included in) a memory that stores data and may be in any suitable form including a magnetic stripe, a memory chip, etc. The memory may store digital certificates and related cryptographic data. Certificates may include root CA certificates, membership provider certificates, payment provider certificates, member certificates, member data, payment certificates, etc. Any of this information may be transmitted by the phone 18.

In some embodiments, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The phone 18 may further include a contactless element 18(g), which is typically implemented in the form of a semiconductor chip (or other data storage element) with an associated wireless transfer (e.g., data transmission) element, such as an antenna. Contactless element 18(g) is associated with (e.g., embedded within) phone 18 and data or control instructions transmitted via a cellular network may be applied to contactless element 18(g) by means of a contactless element interface (not shown). The contactless element interface functions to permit the exchange of data and/or control instructions between the mobile device circuitry (and hence the cellular network) and an optional contactless element 18(g).

Contactless element 18(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that may be used to exchange data between the phone 18 and an interrogation device. Thus, the phone 18 is capable of communicating and transferring data and/or control instructions via both cellular network and near field communications capability.

The phone 18 may also include a processor 18(c) (e.g., a microprocessor) for processing the functions of the phone 18 and a display 18(d) to allow a user to see phone numbers and other information and messages. The phone 18 may further include input elements 18(e) to allow a user to input information into the device, a speaker 18(f) to allow the user to hear voice communication, music, etc., and a microphone 18(i) to allow the user to transmit her voice through the phone 18. The phone 18 may also include an antenna 18(a) for wireless data transfer (e.g., data transmission).

Figure 19:
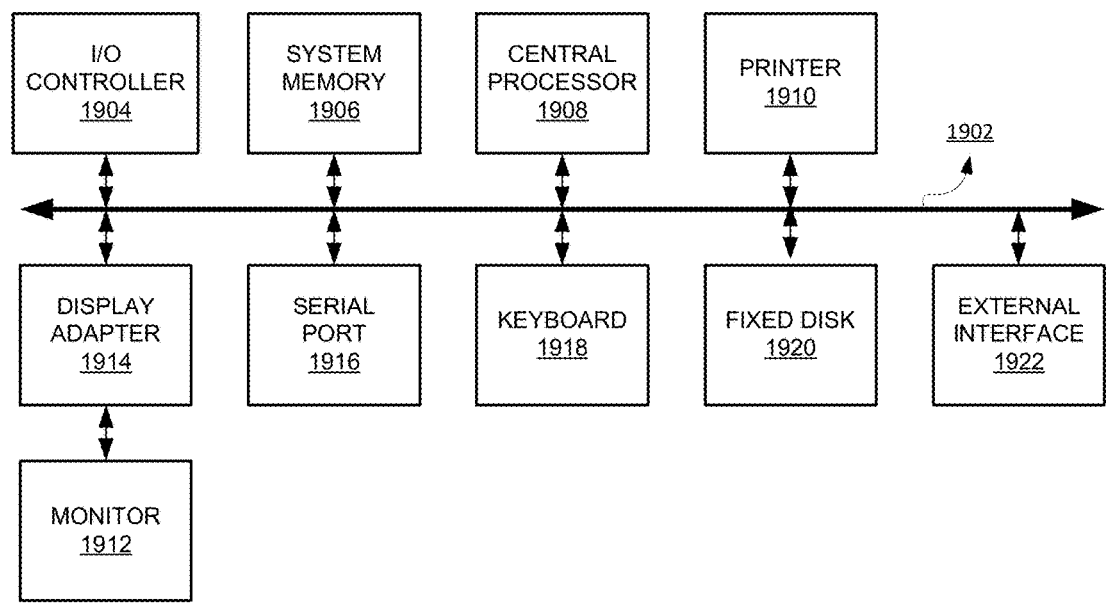
FIG. 19 is a high level block diagram of a computer system.

FIG. 19 is a high level block diagram of a computer system that may be used to implement any of the entities or components described above. The subsystems shown in FIG. 19 are interconnected via a system bus 1902. Additional subsystems include a printer 1910, keyboard 1918, fixed disk 1920, and monitor 1912, which is coupled to display adapter 1914. Peripherals and input/output (I/O) devices, which couple to I/O controller 1904, can be connected to the computer system by any number of means known in the art, such as a serial port. For example, serial port 1916 or external interface 1922 can be used to connect the computer apparatus to a wide area network such as the Internet, a mouse input device, or a scanner. The interconnection via system bus 1902 allows the central processor 1908 to communicate with each subsystem and to control the execution of instructions from system memory 1906 or the fixed disk 1920, as well as the exchange of information between subsystems. The system memory 1906 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
electronically receiving, by a terminal from a multi-purpose device of a member, a signed member certificate comprising member attributes indicating member benefit information for adjusting a transaction associated with the member, wherein the signed member certificate is signed using a membership provider private key corresponding to a membership provider certificate public key of a signed membership provider certificate associated with a membership provider certificate authority;
electronically receiving, by the terminal from the same multi-purpose device, a payment certificate comprising payment attributes for processing the transaction, the payment certificate being different from the signed member certificate;
digitally verifying, by the terminal, the member attributes of the signed member certificate using the membership provider certificate public key of the membership provider certificate that is associated with the membership provider certificate authority;
digitally verifying, by the terminal, the signed membership provider certificate associated with the membership provider certificate authority using a root certificate public key associated with a root certificate authority;
determining, using the terminal, the member benefit information for the member in response to the digital verification of the member attributes and the digital verification of the signed membership provider certificate, the determining of the member benefit information based on the member attributes of the signed member certificate;
determining a payment balance for the transaction associated with the member in response to determining the member benefit information, the determining of the payment balance based on a transaction amount for the transaction and the member benefit information, the payment balance including an adjustment to the transaction amount based on the member benefit information; and
processing the payment balance based on the payment attributes of the payment certificate received from the multi-purpose device.

2. The method of claim 1, wherein the payment certificate is signed using a payment provider private key corresponding to a payment provider public key of a signed payment provider certificate associated with a payment provider certificate authority.

3. The method of claim 2, further comprising:
digitally verifying, by the terminal, the payment certificate received from the multi-purpose device using the payment provider public key of the signed payment provider certificate; and
digitally verifying, by the terminal, the signed payment provider certificate associated with the payment provider certificate authority using the root certificate public key that is associated with the root certificate authority, wherein the membership provider certificate authority and payment provider certificate authority share the same root certificate authority.

4. The method of claim 1, wherein the member attributes comprise a member certificate public key from a member certificate public-private key pair associated with the member certificate.

5. The method of claim 4, further comprising:
receiving, by the terminal, member data, wherein the member data is signed by a member certificate private key associated with the member certificate; and
digitally verifying contents of the member data.

6. The method of claim 4, wherein data received from the multi-purpose device is encrypted using a member certificate private key associated with the member certificate, wherein digitally verifying the contents comprises decrypting the portion of data using the member certificate public key associated with the member certificate.

7. The method of claim 1, further comprising:
prompting a user for a password or biometric reading;
receiving the password or the biometric reading; and
verifying the password or the biometric reading using attributes stored in the membership certificate.

8. The method of claim 1,
wherein the at least one transaction associated with the member includes a medical service or a medical merchandise provided to the member; and
wherein the member benefit information associated with the member is a medical insurance benefit provided by a medical insurance provider.

9. The method of claim 1, wherein determining the payment balance comprises:
determining, by the terminal, a cost associated with the transaction; and
providing, by the terminal, a discount based on the member benefit information.

10. The method of claim 1, wherein digitally verifying the contents of the member certificate comprises:
decrypting a digital signature of the member certificate using the membership provider public key; and
verifying that the decrypted digital signature matches an expected value.

11. The method of claim 10, wherein the expected value is a hash of the member certificate.

12. The method of claim 1, wherein the member benefit information determined from the member attributes of the member certificate determines a deductible amount or a co-pay amount.

13. The method of claim 1, wherein the member certificate belongs to a member certificate chain including the member certificate, a membership provider certificate, and a root certificate, and wherein the payment certificate belongs a payment certificate chain including the payment certificate, a payment provider certificate, and the root certificate.

14. The method of claim 1, further comprising:
encrypting, by the terminal, a session key using the member certificate public key associated with the member certificate;
sending, by the terminal, the encrypted session key to the multi-purpose device in response to the verifying of the member attributes of the signed member certificate, wherein the encrypted session key is decrypted by the multi-purpose device using a member certificate private key associated with the member certificate, and wherein data sent from the multi-purpose device is encrypted using the session key.

15. A terminal comprising:
   a processor; and
   a non-transitory computer-readable storage medium, comprising code executable by the processor for implementing a method comprising:
   electronically receiving, from a multi-purpose device of a member, a signed member certificate comprising member attributes indicating member benefit information for adjusting a transaction associated with the member, wherein the signed member certificate is signed using a membership provider private key corresponding to a membership provider certificate public key of a signed membership provider certificate associated with a membership provider certificate authority;
   electronically receiving, from the same multi-purpose device, a payment certificate comprising payment attributes for processing the transaction, the payment certificate being different from the signed member certificate;
   digitally verifying the member attributes of the signed member certificate using the membership provider certificate public key of the membership provider certificate that is associated with the membership provider certificate authority;
   digitally verifying the signed membership provider certificate associated with the membership provider certificate authority using a root certificate public key associated with a root certificate authority;
   determining, the member benefit information for the member in response to the digital verification of the member attributes and the digital verification of the signed membership provider certificate, the determining of the member benefit information based on the member attributes of the signed member certificate;
   determining a payment balance for a transaction associated with the member in response to determining the member benefit information, the determining of the payment balance based on a transaction amount for the transaction and the member benefit information, the payment balance including an adjustment to the transaction amount based on the member benefit information; and
   processing the payment balance based on the payment attributes of the payment certificate received from the multi-purpose device.

16. The terminal of claim 15, wherein the payment certificate is signed using a payment provider private key corresponding to a payment provider public key of a signed payment provider certificate associated with a payment provider certificate authority.

17. The terminal of claim 16, wherein the method further comprises:
   digitally verifying the payment certificate received from the multi-purpose device using the payment provider public key of the signed payment provider certificate; and
   digitally verifying the signed payment provider certificate associated with the payment provider certificate authority using the root certificate public key that is associated with the root certificate authority, wherein the membership provider certificate authority and payment provider certificate authority share the root certificate authority.

18. The terminal of claim 15, wherein the member attributes comprise a member certificate public key from a member certificate public-private key pair associated with the member certificate.

19. The terminal of claim 18, wherein the method further comprises:
   receiving, at a terminal, member data, wherein the member data is signed by a member certificate private key associated with the member certificate; and
   digitally verifying contents of the member data.

20. The terminal of claim 18, wherein data sent from the multi-purpose device is encrypted using a member certificate private key associated with the member certificate, wherein digitally verifying the contents comprises decrypting the portion of data using the member certificate public key associated with the member certificate.

21. The terminal of claim 15, wherein the method further comprises:
   prompting a user for a password or biometric reading;
   receiving the password or the biometric reading; and
   verifying the password or the biometric reading using attributes stored in the member certificate.

22. The terminal of claim 15,
   wherein the at least one transaction associated with the member is a medical service or a medical merchandise provided to the member; and
   wherein the member benefit information associated with the member is a medical insurance benefit provided by a medical insurance provider.

* * * * *